(12) United States Patent
Knorr

(10) Patent No.: US 12,087,006 B2
(45) Date of Patent: Sep. 10, 2024

(54) METHOD FOR GENERATING AN OPTICAL MARKER, METHOD FOR RECOGNIZING AN OPTICAL MARKER, AND MARKER DEVICE THAT INCLUDES THE OPTICAL MARKER

(71) Applicant: Robert Bosch GmbH, Stuttgart (DE)

(72) Inventor: Moritz Michael Knorr, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 397 days.

(21) Appl. No.: 17/498,114

(22) Filed: Oct. 11, 2021

(65) Prior Publication Data
US 2022/0122282 A1 Apr. 21, 2022

(30) Foreign Application Priority Data
Oct. 19, 2020 (DE) ...................... 10 2020 213 141.4

(51) Int. Cl.
| | |
|---|---|
| G06T 7/00 | (2017.01) |
| G01C 11/06 | (2006.01) |
| G01C 15/02 | (2006.01) |
| G06T 7/66 | (2017.01) |
| G06T 7/73 | (2017.01) |

(52) U.S. Cl.
CPC ................ *G06T 7/66* (2017.01); *G01C 11/06* (2013.01); *G01C 15/02* (2013.01); *G06T 7/73* (2017.01)

(58) Field of Classification Search
CPC .... G06T 7/66; G06T 7/73; G06T 7/70; G06T 7/80; G01C 11/06; G01C 15/02; G01C 11/04; G06K 1/121; G06K 7/1417; G06K 19/06037
See application file for complete search history.

(56) References Cited

U.S. PATENT DOCUMENTS

| | | | | |
|---|---|---|---|---|
| 2007/0069398 | A1* | 3/2007 | Smith | H01L 22/34 |
| | | | | 438/797 |
| 2007/0209447 | A1* | 9/2007 | Christ | G01L 1/247 |
| | | | | 73/800 |
| 2021/0192759 | A1* | 6/2021 | Lang | G06T 3/40 |

FOREIGN PATENT DOCUMENTS

| | | | | |
|---|---|---|---|---|
| KR | 20080085543 A | * | 12/2008 | ............. H01L 22/34 |
| WO | WO-2004011876 A1 | * | 2/2004 | ............. G01B 11/25 |

* cited by examiner

*Primary Examiner* — Ping Y Hsieh
*Assistant Examiner* — Xiao Liu
(74) *Attorney, Agent, or Firm* — NORTON ROSE FULBRIGHT US LLP; Gerard A. Messina

(57) ABSTRACT

A method for generating an optical marker for image processing/photogrammetry/motion detection using an output unit and/or a control and/or regulation unit. The optical marker is output/generated in such a way that the represented optical marker is formed by a regular pattern of angular structures and by substructures, each of which is situated completely within one of the structures. In each case, at least two directly adjacent structures, viewed in at least two mutually perpendicularly oriented directions along a projection plane of the optical marker, have different colors, and a color sequence of the plurality of structures periodically repeats along the two directions. The optical marker is formed from unique minimum recognition areas within the optical marker. The optical marker is output/generated in such a way that the substructures each include an imaging surface that corresponds to at least 15% of a maximum projection surface spanned by one of the structures.

17 Claims, 11 Drawing Sheets

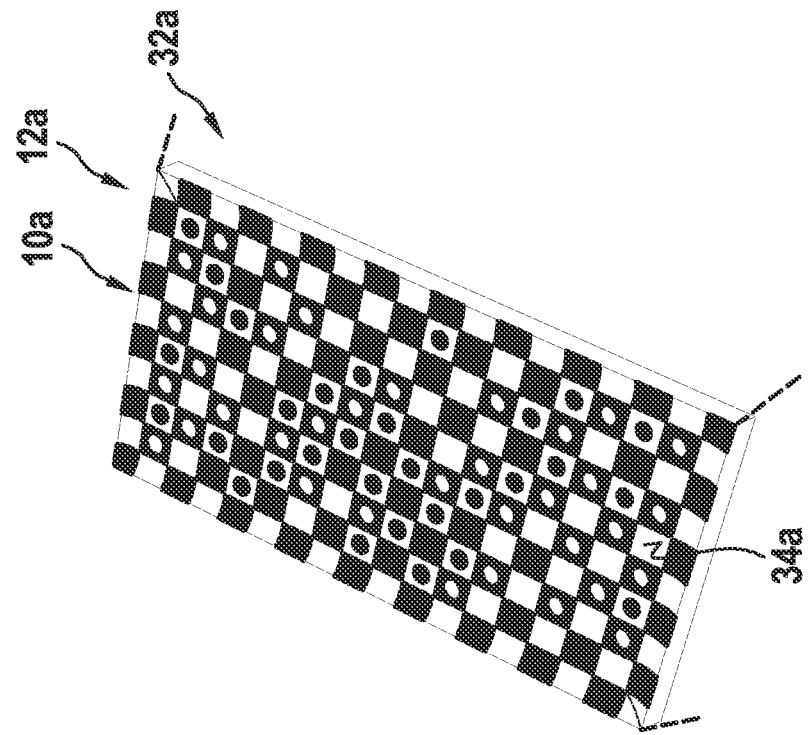
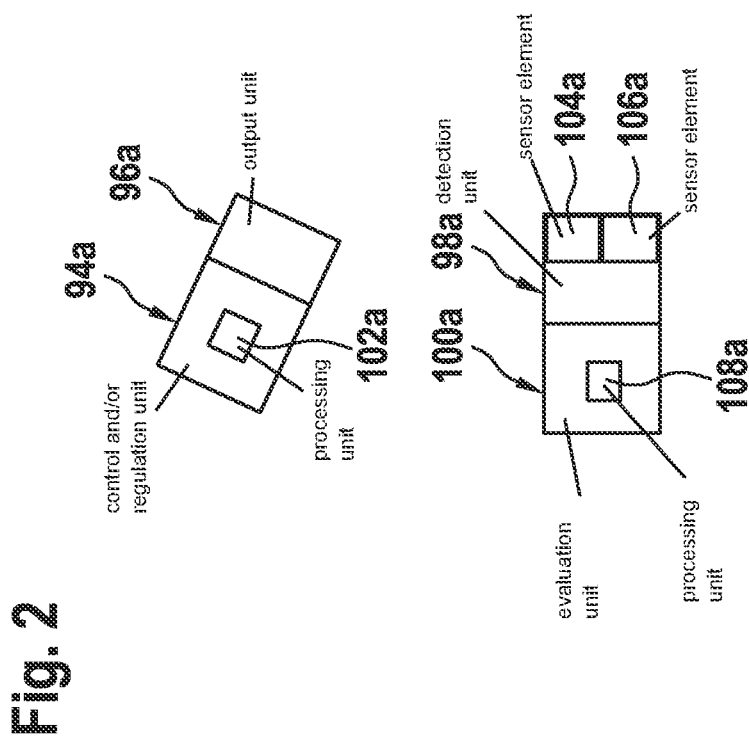
Fig. 2

METHOD FOR GENERATING AN OPTICAL MARKER, METHOD FOR RECOGNIZING AN OPTICAL MARKER, AND MARKER DEVICE THAT INCLUDES THE OPTICAL MARKER

BACKGROUND INFORMATION

A method for generating an optical marker for image processing, for photogrammetry, and/or for motion detection with the aid of at least one output unit and/or at least one control and/or regulation unit has already been provided, in at least one method step the optical marker being output and/or generated in such a way that the represented optical marker is formed by a regular pattern of a plurality of angular structures and a plurality of substructures, each of which is situated within one of the structures, in each case at least two directly adjacent structures, viewed in at least two mutually perpendicularly oriented directions along a projection plane of the optical marker, having different colors, a color sequence of the plurality of structures periodically repeating along the two directions, and the optical marker being formed from a plurality of minimum recognition areas within the optical marker, which are in each case unique.

SUMMARY

The present invention is directed to a method for generating an optical marker for image processing, for photogrammetry, and/or for motion detection with the aid of at least one output unit and/or at least one control and/or regulation unit. In accordance with an example embodiment of the present invention, in at least one method step the optical marker being output and/or generated in such a way that the represented optical marker is formed by a regular pattern of a plurality of angular structures and a plurality of substructures, each of which is situated, in particular completely, within one of the structures, in each case at least two directly adjacent structures, viewed in at least two mutually perpendicularly oriented directions along a projection plane of the optical marker, having different colors, a color sequence of the plurality of structures periodically repeating along the two directions, and the optical marker being formed from a plurality of minimum recognition areas within the optical marker, which are in each case unique.

In accordance with an example embodiment of the present invention, it is provided that in at least one method step, in particular the at least one method step, the optical marker is output and/or generated in such a way that the substructures each include an imaging surface that corresponds to at least 15%, preferably at least 20%, and more preferably at least 24%, of a maximum projection surface spanned by one of the structures.

Due to the example embodiment of the method according to the present invention, an advantageously simple and accurate recognition of the optical marker may be made possible. An advantageously large maximum detection range of the optical marker may be made possible, from which the substructures may still be recognized with a sufficiently high probability. An advantageously low minimum resolution of the optical marker may be achieved, via which the optical marker may still be recognized with a sufficiently high probability. An advantageously low probability of error in recognizing the optical marker may be achieved. An advantageously unambiguous and rapid association of detected subareas of the optical marker within the optical marker may be made possible in this way. An advantageously good recognition of the substructures may be made possible, for example when there is poor resolution of the optical marker, or under poor recording conditions such as smoke, darkness, or the like. In particular, an advantageously accurate optical marking of objects may be achieved. Large surfaces may advantageously be covered. A detection of the optical marker and/or an association of a detected subarea of the optical marker independently of a detection of an edge area of the optical marker may preferably be made possible. An advantageously large optical marker for detecting objects which at the same time are advantageously small may be achieved in this way.

An "imaging surface" of an object, in particular of the substructures, is understood in particular to mean a surface that is covered by the object in at least one projection plane, in particular on a surface of the object and/or in an image plane of a detection unit that detects the optical marker. A "detection unit" is understood in particular to mean an electronic and/or optical unit that includes at least one detection element designed as a sensor. The detection unit, in particular the detection element for detecting an object, the optical marker, and/or a subarea of the optical marker that is imaged and/or represented in particular on a surface and/or on the object, is preferably provided. In particular, the imaging surface corresponds to a maximum surface that is concealed by the object, not including recesses or the like. For example, an imaging surface of a circular ring corresponds only to the surface between two circular contours of the circular ring, not including an inner surface of the circular ring. In particular, the imaging surface has a cohesive and/or single-color design. A "projection surface" of an object, in particular of the structures, is understood in particular to mean a maximum surface that is spanned by the object in at least one projection plane, in particular on a surface of an object and/or in an image plane of a detection unit that detects the optical marker. In particular, the projection surface corresponds to a maximum surface of the object that is spanned by an outer contour of the object in the projection plane. For example, a projection surface of a circular ring corresponds to a surface that is spanned by an outermost circular contour of the circular ring, and that in particular also encompasses an inner surface of the circular ring. The projection surface of structures in which a substructure is situated in each case particularly preferably also encompasses a surface of these substructures. The optical marker is preferably output and/or generated in such a way that the substructures each include an imaging surface that corresponds to at most 70%, preferably at most 60%, more preferably at most 50%, and particularly preferably at most 40%, of the maximum projection surface of the structures. All structures of the optical marker preferably have identical basic shapes. All substructures of the optical marker preferably have identical basic shapes. In particular, all structures of the optical marker have the same orientation. All structures of the optical marker particularly preferably have at least essentially identical designs, and in each case include a projection surface, the projection surfaces being at least essentially identical to one another. All structures of the optical marker particularly preferably have at least essentially identical designs, and in each case include an imaging surface, the imaging surfaces being at least essentially identical to one another. It is possible for the optical marker to be output and/or generated in such a way that the optical marker includes a plurality of substructures having different designs, and/or a plurality of structures having different designs. In particular, the individual substructures each include an imaging surface that corresponds to at least 15%, preferably at least 20%, and more preferably at least 24%, of a maximum projection plane of a structure within which the particular substructure is situated. It is possible, for example for a basic shape of the structures that is different from a quadrangular basic shape, or if the structures have more than one basic shape, for one portion of the structures of the optical marker to have a different orientation than another portion of the structures of the optical marker.

The method for generating the optical marker and/or the optical marker is preferably provided for ascertaining at least one location, a movement, and/or a shape of an object, in particular in a contactless manner, via at least one image of the object. In particular, the object includes the optical marker and/or images the optical marker. The term "provided" is understood in particular to mean specially designed and/or specially equipped. The statement that an object is provided for a certain function is understood in particular to mean that the object fulfills and/or carries out this certain function in at least one application state and/or operating state. For example, the method is used to detect a surface, in particular a shape of a surface, of an object, a movement of an object within a detection range of a detection unit, a position and/or movement of a detection unit relative to an object, a distance between a detection unit and an object, or the like. It is possible for the method to be used in the field of camera calibration, in a field of in particular automatic surroundings detection, in the field of motion tracking, for navigating at least semi-autonomous robots, or the like. The optical marker is preferably output and/or generated in such a way that the optical marker is at least partially visible on the object. In particular, during the generation/production of the optical marker, the optical marker is applied to the object, for example printed, or projected onto the object. The optical marker is preferably produced and/or generated with the aid of the control and/or regulation unit. A "control and/or regulation unit" is understood in particular to mean a unit including at least one control electronics system. A "control electronics system" is understood in particular to mean a unit including a processor unit that is designed in particular as an FPGA, as a processor, as a microcontroller, or the like, and including a memory unit that is designed in particular as a physical and/or digital memory or the like, and an operating program that is stored in the memory unit. The in particular produced and/or generated optical marker is preferably output with the aid of the output unit, in particular printed on or projected onto at least one surface. In particular, the represented optical marker is visible on the surface. It is possible for the optical marker that is output to be only partially visible on a surface.

The optical marker is preferably output and/or generated in such a way that the structures are seamlessly situated next to one another. For example, the structures have a checkerboard-like configuration. In particular, the structures each have one of at least two, in particular exactly two, different colors, in particular black or white. The optical marker is preferably output and/or generated in such a way that the substructures each have one of at least two, in particular exactly two, different colors, in particular black or white. It is possible for the optical marker to be designed in such a way that exactly one color of the structures and/or of the substructures is provided via a color of a surface that the optical marker includes or the optical marker images, the structures and/or substructures that have the exactly one color being omitted by the output unit for an output of the optical marker. In particular, the structures and/or substructures having the exactly one color are not printed on or projected onto the surface for the output of the optical marker, but, rather, are visible in particular via a contrast with other structures and/or substructures that are preferably printed on or projected onto the surface.

The optical marker is preferably output and/or generated in such a way that the substructures are each situated completely within one of the structures, an imaging surface of the substructure being completely surrounded by the projection surface of the structure. A "minimum recognition area" is understood in particular to mean the smallest structural arrangement made up of adjacently situated structures and substructures of the optical marker that occurs within the optical marker exactly once. A size of the minimum recognition areas is preferably a function of a maximum size of the optical marker. In particular, the minimum recognition areas are each formed from the same number of structures, which in particular have the same configuration. In one preferred embodiment, the minimum recognition areas each have an at least essentially rectangular, in particular square, basic shape, which in particular encompasses all structures within the individual minimum recognition areas. It is particularly preferred that only the structures of the optical marker are arranged in a regular pattern, in particular the substructures predefining the minimum recognition areas via an irregular arrangement within structures. The substructures within the optical marker are particularly preferably disordered, in particular not arranged in a regular pattern.

The substructures are preferably each situated within an individual structure of the structures of the optical marker. The substructures preferably in each case at least partially cover the structure in which the particular substructure is situated, preferably across the imaging surface of the substructure. The structures, in particular all structures, of the optical marker preferably have identical projection surfaces and/or identical outer contours. In particular, a surface of the structures, spanned by the outer contour of the structures, that has the same color and that in particular is different from the projection surface, may in each case be different for structures with a substructure situated within the structure and for structures without a substructure situated within the structure. The substructures, in particular imaging surfaces of the substructures, in each case preferably have a different color than the particular structure in which the substructures are situated. In particular, the projection surfaces of structures in which a substructure is situated in each case encompass in each case the imaging surface of the particular substructure situated in the structure. Projection surfaces of structures in which a substructure is situated in each case preferably do not have a single-color/two-color design, in particular surfaces of the structures, spanned by the outer contours of the structures, of the same color having a different color than imaging surfaces of the substructures situated within the structures.

Furthermore, it is provided that in at least one method step the optical marker is generated as a function of at least one predefined marker parameter with the aid of a procedural generation, using the control and/or regulation unit, at least the marker parameter and/or at least one further marker parameter of the optical marker being adapted. An advantageously flexible generation of the optical marker may be achieved. An advantageously simple adaptation of the optical marker to application- and/or surroundings-specific parameters may be made possible. For example, a maximum size or a basic shape of the optical marker may be adapted, in particular dynamically and/or automatically, to a shape of an object to be detected, or a distance from an object to be detected. A "procedural generation" is understood in particular to mean a generation of an in particular virtual object, in particular the optical marker, that is generated without an exact specification of the configuration of the object by a user, with the aid of deterministic algorithms, as a function of predefined output conditions, in particular generated by the at least one marker parameter. In particular, two objects generated under identical output conditions via the procedural generation have identical designs. A "marker parameter" is understood in particular to mean a parameter that describes or predefines at least one property of the optical marker for the procedural generation. The procedural generation of the optical marker particularly preferably takes place with the aid of the control and/or regulation unit. In particular, an input and/or an adaptation of the predefined marker parameter takes place with the aid of at least one input unit that transmits the marker parameter to the control and/or regulation unit. In particular, the predefined marker parameter is stored in the control and/or regulation unit. The marker parameter and/or the at least one further marker parameter are/is preferably adapted as a function of the at least one predefined marker parameter during the procedural generation of the optical marker. For example, the predefined marker parameter is designed as a maximum size and/or as a basic shape of the optical marker and/or of the maximum detection areas, which in particular are/is indicated via the number and/or an arrangement of the structures spanning the optical marker and/or the maximum detection areas. It is also possible for the maximum size of the optical marker to be indicated via the number of minimum recognition areas. Alternatively or additionally, it is possible for a maximum size and/or a basic shape of the optical marker to be indicated via a shape, for example a basic shape, and/or a length-to-side ratio, of an object to be detected, in particular the optical marker having a similar or identical basic shape being generated. In another exemplary embodiment, a predefined marker parameter is designed as a distance from an object to be detected, in particular the optical marker being generated with the aid of the control and/or regulation unit in such a way that at least one minimum recognition area or a predefined number of minimum recognition areas of the optical marker is/are represented on the object, in particular a surface of the object. The at least one marker parameter or the at least one further marker parameter is preferably designed as an arrangement of the individual substructures within the optical marker, in particular within the regular pattern of the structures. For example, the marker parameter and/or the at least one further marker parameter are/is designed as a maximum size or a minimum size of the optical marker, as the number of colors to be used for the structures and/or the substructures, or the like.

Moreover, it is provided that in at least one method step the optical marker is generated with the aid of the control and/or regulation unit as a function of at least one surroundings parameter that is detected in particular with the aid of a detection unit, in particular automatically and/or with the aid of a, in particular the above-described, procedural generation, at least one marker parameter, in particular the marker parameter, the further marker parameter, or some other marker parameter of the optical marker being adapted. An advantageously flexible generation of the optical marker may be achieved. An advantageously simple adaptation of the optical marker to surroundings-specific parameters may be made possible. In at least one method step, the surroundings parameter is preferably detected, in particular continuously or periodically, with the aid of the detection unit. A "surroundings parameter" is understood in particular to mean a parameter that describes the surroundings of the output unit, of the detection unit, and/or of an object that includes the represented optical marker. The surroundings parameter preferably describes at least one surroundings present between the output unit and/or the detection unit and the object to be detected. For example, the surroundings parameter is designed as an optical density of ambient air or the like, as the number and/or a size of objects to be detected, as a recognition of an object to be detected in a detection range, as a size of an in particular predefined and/or ascertained detection range, as an illumination intensity of an object to be detected, or the like. A generation of the optical marker preferably takes place with the aid of the procedural generation, via the control and/or regulation unit, as a function of the at least one surroundings parameter and the at least one predefined marker parameter. For example, with the aid of the detection unit, a visible angular range to be taken into account is detected in which in particular objects are to be detected, for example a roadway entrance, a moving object, or the like, a size and a shape of the optical marker being adapted to this angular range. An advantageously efficient utilization of the computing power may take place, or the time for recognizing the projected pattern on a surface/the object may be reduced. Another exemplary embodiment is an adaptation of the colors of the structures and of the substructures to light conditions, detected with the aid of the detection unit, in an area to be detected, as the result of which in particular an advantageously accurate and rapid recognition of the optical marker may be made possible.

In addition, it is provided that in at least one method step the optical marker is output and/or generated in such a way that the substructures are each designed in the shape of a circular surface and centrally situated within a structure of the plurality of structures. Due to the circular surface-shaped substructures, a generation of additional corners within the optical marker may advantageously be prevented. Accidentally mixing up structures and substructures may thus be avoided, and/or an advantageously unambiguous and error-free recognition of the structures may be ensured. The substructures may advantageously be easily applied subsequently to existing patterns. A recognition of the optical marker may advantageously easily take place via a correlation. The substructures are preferably each situated in such a way that a midpoint of the circular surface-shaped substructure is situated on a geometric centroid of area of one of the structures. In particular, the imaging surface of the substructures corresponds to a circular surface. It is particularly preferred that at least one substructure is situated in each case in each minimum recognition area of the optical marker.

Furthermore, it is provided that in at least one method step the optical marker is output and/or generated in such a way that in each case a rectangular, in particular square, area of the optical marker that is spanned at least by 9, preferably at least by 12, and more preferably at least by 16, adjacently situated structures forms a minimum recognition area. An advantageously large maximum size of the optical marker may be made possible, each minimum recognition area being individually, unambiguously associatable with a position within the optical marker. An advantageous embodiment of the optical marker may be made possible, it being possible for a recognition of a subarea of the optical marker and a determination of a position of this subarea to take place independently of a detection of an edge of the optical marker. The minimum recognition areas are preferably each formed via a square arrangement of structures, in particular via a 3×3 matrix of structures or a 4×4 matrix of structures. Each subarea of the optical marker that has at least the size of a minimum recognition area is preferably uniquely associatable within the optical marker and/or unambiguously associatable with a position within the optical marker.

Moreover, it is provided that in at least one method step the optical marker is output and/or generated in such a way that the structures each have one of at least two colors, and the substructures each have one of at least two other colors, in each case at least one color of the two colors having at least essentially the same brightness value as at least one other color of the two other colors, in particular the at least one color and the at least one other color being at least essentially indistinguishable via a grayscale recognition. An advantageously accurate and unambiguous detection of the structures and of the substructures may be made possible. In particular, a detection of the structures and of the substructures may advantageously be achieved independently of one another. For example, the structures may be detected via a grayscale recognition in which the substructures are not visible. In particular, the substructures may be detected via a color value recognition in which the structures are not visible. An advantageously accurate association of substructures with a position of structures may be made possible. In particular, it is possible for the structures and/or the substructures of the optical marker to each have one of more than two different colors. A further color of the two colors preferably has at least essentially the same brightness value as a further other color of the two other colors, in particular the further color and the further other color being at least essentially indistinguishable via a grayscale recognition. In particular, the two colors, in particular the color and the further color, each have no color value and are preferably provided as black, white, or a gray tone. The color and the further color are particularly preferably provided to be detected via a grayscale recognition. In particular, the color and the further color are distinguishable via a grayscale recognition. The other color and the further other color are particularly preferably provided to be detected via a color value recognition. In particular, the other color and the further other color are distinguishable via a color value recognition. The structures of the optical marker, each of which has the color or the further color, are preferably provided to be detected, independently of the substructures, via a grayscale recognition. The substructures of the optical marker, each of which has the color or the further other color, are preferably provided to be detected, independently of the structures, via a color value recognition. Alternatively, it is also possible for the structures and the substructures to be designed in such a way that the substructures are detected with the aid of a grayscale recognition, and the structures are detected with the aid of a color value recognition. For example, the structures are each designed to be light gray or dark gray, and the substructures are each designed to be yellow or blue. In particular, the light gray structures have the same brightness value/grayscale as the yellow substructures, and the dark gray structures have the same brightness value/grayscale as the blue substructures.

In addition, it is provided that the optical marker is generated with the aid of the control and/or regulation unit in such a way that the optical marker, in particular the minimum recognition areas, in each case for a reflection and/or for a rotation about an angle that in particular corresponds to a natural multiple of $2\pi/n$, is/are unambiguously recognizable and associatable. An advantageously large number of various fields of application of the optical marker may be made possible, for example for determining an orientation of an object in space that detects the optical marker, or of an object in space that includes the optical marker. An unambiguous association for a reflection of the optical marker and/or for a rotation of the optical marker about the angle that in particular corresponds to a natural multiple of $2\pi/n$ is preferably designed in each case as a marker parameter for a procedural generation of the optical marker with the aid of the control and/or regulation unit. In particular, n corresponds to the number of corners of the structures, in particular to a basic shape of the structures, of the optical marker. The angle (the optical marker, in particular the minimum recognition areas, for a rotation about the angle being unambiguously recognizable and associatable) preferably corresponds to a multiple of 90° for a rectangular basic shape of the structures of the optical marker, in particular to a multiple of 60° for a hexagonal basic shape of the structures of the optical marker, and/or preferably to a multiple of 120° for a triangular basic shape of the structures of the optical marker. The angle (the optical marker, in particular the minimum recognition areas, for a rotation about the angle being unambiguously recognizable and associatable) particularly preferably corresponds to a multiple of an angle that is spanned by axes of symmetry of a basic shape of the structures of the optical marker, in particular within a plane of the optical marker. The optical marker, in particular the minimum recognition areas, is/are preferably unambiguously recognizable and associatable in each case for a reflection at an in particular imaginary axis, which is preferably situated in parallel to an axis of symmetry of a basic shape of the structures of the optical marker and in a shared plane with the optical marker, preferably via an arrangement of substructures within the optical marker and/or the minimum recognition areas. The optical marker, in particular the minimum recognition areas, is/are preferably unambiguously recognizable and associatable in each case for a reflection at an in particular imaginary plane that is preferably situated in parallel to an axis of symmetry of a basic shape of the structures of the optical marker and perpendicular to a main plane of extension of the optical marker. The optical marker, in particular the minimum recognition areas, is/are preferably unambiguously recognizable and associatable in each case for a reflection and/or for a rotation about the angle via an arrangement of substructures within the optical marker, in particular the minimum recognition areas. The minimum recognition areas are preferably in each case unique within the in particular unrotated optical marker, within a reflected image of the optical marker, and/or within an image of the optical marker that is rotated by the angle.

Furthermore, it is provided that in at least one method step the optical marker is optically projected onto a surface of an object with the aid of the output unit. An advantageously high level of flexibility for use of the optical marker may be achieved. In particular, independent objects, in particular a movement, an orientation, and/or a configuration of objects, may advantageously be detected and/or monitored without processing or the like via the optical marker. The optical marker is preferably generated with the aid of the control and/or regulation unit and output with the aid of the output unit. Alternatively, it is possible for the output unit to apply, for example print, the optical marker onto the surface of the object. Alternatively, it is possible for an object, in particular a marker device, to include the optical marker, in particular the optical marker having been situated at the object or provided on the object during manufacture, with the aid of an/the output unit.

Moreover, it is provided that the optical marker is generated with the aid of the control and/or regulation unit in such a way that in the minimum recognition areas of the optical marker, at least one piece of information in each case is transmitted via an arrangement of substructures in the particular minimum recognition area or by a portion of the substructures situated within the minimum recognition area, in particular relative to the structures situated in the minimum recognition area. An advantageously high level of flexibility of use of the optical marker may be made possible. Pieces of information may preferably be transmitted via a detection of the optical marker or of a subarea of the optical marker, in particular independently of further sensors or the like. For example, an originally generated size, such as an edge length of an individual structure, may be transmitted via an arrangement of substructures, it being possible in particular to ascertain a distance of an object, including the optical marker, to a detection unit. For example, the information is provided as a geometric size within the optical marker, in particular viewed in a fixed projection plane relative to the output unit or in a surface that includes the optical marker. In particular, it is possible for the information to additionally include a reference plane for the geometric size, such as the projection plane mentioned above. Alternatively or additionally, it is possible for the information to include an identification number of the output unit that outputs the optical marker. For example, if multiple output units are used in an area, an association of detected optical markers may thus be made possible. It is possible for the substructures that transmit pieces of information to be situated within the optical marker in a predefined pattern and/or at a predefined distance, in particular substructures outside such a pattern not contributing to a transmission of pieces of information. In particular, the predefined pattern is stored in the control and/or regulation unit and/or in the detection unit in at least one method step. The information is preferably encoded via an arrangement of the substructures in each minimum recognition area of the optical marker, with the aid of the control and/or regulation unit. In one preferred embodiment, a linear measure of the structures, for example, is transmitted, via the arrangement of the substructures, in particular for a detection of the represented optical marker, it being possible to ascertain a distance from the object to be considered and/or a size of the object to be considered.

In addition, it is provided that in at least one method step the optical marker is output and/or generated in such a way that the angular structures each have a triangular basic shape. An advantageously high density of structures within the optical marker may be made possible. An advantageously compact size of the optical marker may be achieved, in particular with a consistently high information density of the optical marker.

Moreover, the present invention is directed to a method for recognizing an optical marker, in particular an optical marker generated using a method according to the present invention, for generating an optical marker, for image processing, for photogrammetry, and/or for motion detection, in at least one method step at least one subarea of the optical marker that is visible on a surface being detected with the aid of at least one detection unit, and at least one pattern of the subarea being ascertained with the aid of at least one evaluation unit, in at least one method step intersection points of structures of the optical marker situated in the subarea and an arrangement of substructures of the optical marker situated in the pattern being ascertained with the aid of the evaluation unit for determining a position of the subarea within the optical marker and/or for ascertaining a design and/or a configuration of the surface via a color evaluation and/or contrast evaluation.

Due to the example embodiment of the method according to the present invention, a detection of a surface to be detected and/or of an object to be detected may advantageously be made possible. In particular, for example monitoring of an area around the detection unit may be achieved via the optical marker. A configuration of the surface and/or of the object in space may advantageously be ascertained via an association of the subarea. In particular, a highly accurate detection of the optical marker may thus be achieved. An advantageously simple and low-error detection of the subarea and association of the subarea may preferably be made possible via a ratio of the imaging surfaces of the substructures to the projection surfaces of the structures.

The method for recognizing the optical marker is preferably provided for recognizing the optical marker that is generated with the aid of the control and/or regulation unit and output with the aid of the output unit, in particular as a function of the detected subarea of the optical marker. At least one in particular electronic signal that encompasses the detected subarea is preferably transferred from the detection unit to the evaluation unit. In one preferred embodiment, in at least one method step, in particular for ascertaining the intersection points of the structures and/or of the arrangement of the substructures, with the aid of the detection unit the structures are detected via a grayscale recognition and the substructures are detected via a color value recognition. The structures and the substructures are preferably detected with the aid of the detection unit, in particular in one method step or in two different method steps, independently of one another. In particular, an ascertainment of the arrangement of the substructures in the subarea takes place as a function of the detected intersection points of the structures in the subarea. For ascertaining the arrangement of the substructures in the subarea, in particular as a function of a shape and/or an arrangement of the structures of the optical marker, at least one color value, one grayscale, and/or one contrast value at at least one point relative to the intersection points is preferably determined with the aid of the detection unit and compared to at least one reference value. For example, in particular for a checkerboard-like design of the structures of the optical marker, the intersection points at the corners of the square structures in the subarea, which in particular form a grid configuration including square unit cells, are ascertained with the aid of the detection unit. In corners of the square unit cells or in geometric midpoints of the square unit cells of the ascertained grid configuration, a color value, a grayscale, and/or a contrast value are/is preferably ascertained in each case from the intersection points, with the aid of the detection unit. In corners of the square unit cells, a color of the structures is preferably detected in each case via color values, grayscales, and/or contrast values. In geometric midpoints of the square unit cells, in each case a color of the substructures is preferably detected or the presence of a substructure in the particular structure is ascertained via ascertained color values, grayscales, and/or contrast values. In particular, the subarea is designed as a visible and/or detectable portion of the in particular output optical marker that is imaged on the surface. The ascertained pattern preferably includes at least one arrangement of structures without substructures, in particular situated within the structures, and of structures with substructures, in particular situated within the structures, within the subarea. A distortion of the optical marker on the surface or a curved representation of the optical marker on an arched surface may preferably be ascertained with the aid of the evaluation unit as a function of a configuration of the intersection points. The ascertained distortion and/or curved representation of the optical marker are/is preferably taken into account, with the aid of the evaluation unit, when ascertaining the position of the subarea within the optical marker. For example, the determination of corners and/or points takes place within the subarea for generating the pattern as a function of the ascertained distortion and/or curved representation of the optical marker and/or of the configuration of the intersection points within a projection plane of the detection unit in which in particular the subarea has been recorded.

Furthermore, in accordance with an example embodiment of the present invention, it is provided that in at least one method step, in particular the at least one method step, for determining a position of the subarea within the optical marker a correlation of the ascertained pattern of the subarea, in particular of the ascertained intersection points and/or of the ascertained arrangement of the substructures, takes place using at least one reference pattern from a plurality of stored reference patterns, with the aid of the evaluation unit. An advantageously simple association of the subarea with one of the stored reference patterns may take place. For example, an advantageously simple recognition of a rotation or a reflection of the optical marker in the subarea may be recognized. The reference patterns are preferably stored in the evaluation unit, in particular prior to a detection of the subarea and/or the optical marker. The ascertained pattern and the reference patterns are preferably designed in each case as an arrangement of a plurality of fields, each of which has one of two different colors. The positions of the fields preferably correspond in each case to a position of a structure of the optical marker. A color of the particular fields preferably corresponds to a structure without a substructure, and a further color of the particular fields corresponds to a structure with a substructure. An advantageously rapid evaluation and an advantageously short computing time of the evaluation unit may be made possible via such as design of the pattern and/or the reference pattern. At least one reference pattern of the plurality of reference patterns preferably images the complete optical marker. At least one further reference pattern of the plurality of reference patterns preferably images that complete optical marker which, in particular relative to the reference pattern, images the reflected optical marker. At least one other reference pattern, in particular three other reference patterns, of the plurality of reference patterns preferably image(s) that complete optical marker which, in particular relative to the reference pattern, images the optical marker rotated by a multiple of 90°, in particular each of the other reference patterns imaging a different configuration of the rotated optical marker, in particular for 90°, 180°, and 270°. Alternatively or additionally, it is possible for the optical marker to be divided over multiple reference patterns. If the optical marker is adapted for a generation or an output of the optical marker, it is possible in particular that in at least one method step, in particular prior to a detection or a comparison of the subarea to a reference pattern, the reference patterns are likewise adapted with the aid of the evaluation unit and/or the control and/or regulation unit, in particular analogously to the output and/or represented optical marker. A transmitted piece of information concerning the arrangement of substructures is preferably decrypted in at least one method step with the aid of the evaluation unit. It is possible for the information to be output to a user via a control unit or the like in at least one method step, and/or for the information to be used in at least one method step for a further evaluation, for example for ascertaining a distance of the surface relative to the detection unit and/or for determining a size of the object. At least one reference pattern is preferably stored in the evaluation unit for each arrangement of the optical marker to be recognized, for example a rotated or a reflected arrangement. Alternatively, it is possible for a reference pattern to be procedurally ascertained, in particular merged, via patterns and/or subareas of the optical marker detected by the detection unit, with the aid of the control and/or regulation unit and/or with the aid of the evaluation unit, and in particular stored in the evaluation unit.

Moreover, in accordance with an example embodiment of the present invention, it is provided that in at least one method step, an error parameter is ascertained in each case, with the aid of the evaluation unit, for each possible position of the ascertained pattern of the subarea within the optical marker, the position of the subarea within the optical marker being determined as a function of the ascertained error parameters. An advantageously accurate position determination of the subarea may be made possible. In particular, even in the event of one or multiple incorrectly recognized structures and/or substructures, an association of the subarea within the optical marker may advantageously take place. The subarea, with the aid of the evaluation unit, is preferably associated with a position within the optical marker which, of all possible positions, has a smallest value of the error parameter. The error parameter for each possible position of the subarea within the optical marker is preferably ascertained via a comparison of the ascertained pattern of the subarea to a reference area of a reference pattern. In particular, the reference area is designed in such a way that the reference area and the ascertained pattern of the subarea have identical shapes, in particular with regard to a configuration and the number of structures. For example, the error parameter in each case corresponds to the number of non-matching structures and/or substructures in the ascertained pattern of the subarea relative to the reference area. The possible positions of the ascertained pattern of the subarea within the optical marker are preferably ascertained with the aid of the evaluation unit, in particular prior to ascertaining the error parameters, as a function of a shape of the ascertained pattern of the subarea and of a basic shape of the reference pattern, in particular that is associated with the optical marker.

In addition, a method for image processing, for photogrammetry, and/or for motion detection is proposed, at least one optical marker being generated with the aid of a method according to the present invention for generating an optical marker, and the optical marker being recognized with the aid of a method according to the present invention for recognizing an optical marker.

An advantageously simple and accurate recognition of objects and/or surfaces may be made possible via the embodiment of the method according to the present invention. By use of the optical marker, an advantageously low probability of error in recognizing objects or surfaces may be achieved. An advantageously large detection range may be achieved. An advantageously unambiguous and rapid association of detected subareas of the optical marker within the optical marker may be made possible. An advantageously good recognition of substructures of the optical marker may be made possible, for example where there is poor resolution of the optical marker or under poor recording conditions such as smoke, darkness, or the like.

In addition, in accordance with an example embodiment of the present invention, a marker device for image processing, for photogrammetry, and/or for motion detection, using at least one optical marker that is generated via a method according to the present invention for generating an optical marker, is provided.

An advantageously simple and accurate recognition of a position, of a movement, and/or of an orientation of the marker device may be made possible via the embodiment of the marker device according to the present invention. An advantageously large maximum detection range may be made possible, from which a position, a movement, and/or an orientation of the marker device may still be recognized with a sufficiently high probability. An advantageously low minimum resolution of the optical marker may be achieved in which a position, a movement, and/or an orientation of the marker device may still be recognized with a sufficiently high probability via the optical marker. An advantageously low error probability may be achieved when recognizing the marker device. An advantageously unambiguous and rapid association of visible subareas of the marker device may be made possible in this way. An advantageously good recognition of the substructures of the optical marker may be made possible, for example, when there is poor resolution of the optical marker, or under poor recording conditions such as smoke, darkness, or the like.

The optical marker is preferably situated, in particular imaged or printed, on the marker device in at least one operating state. The marker device is preferably designed and/or situated separately from the detection unit. In one preferred embodiment of the present invention, the marker device is designed as an object that is provided for representing the optical marker, in particular the marker device being designed and/or situated separately from the output unit, the evaluation unit, and/or the control and/or regulation unit. The marker device is preferably not provided for outputting the optical marker. Alternatively or additionally, it is possible for the marker device to be provided for projecting and/or imaging the optical marker onto/on a surface of the marker device, in particular the marker device including at least the output unit.

The method according to the present invention for generating an optical marker, the method according to the present invention for recognizing an optical marker, the method according to the present invention for image processing, for photogrammetry, and/or for motion detection, and/or the marker device according to the present invention are/is not intended to be limited to the application and specific embodiment described above. In particular, for implementing an operating principle described herein, the method according to the present invention for generating an optical marker, the method according to the present invention for recognizing an optical marker, the method according to the present invention for image processing, for photogrammetry, and/or for motion detection, and/or the marker device according to the present invention may include a number of individual elements, components, and units as well as method steps that is different from a number stated herein. In addition, for the value ranges given in the present disclosure, values within the stated limits are also considered to be disclosed and usable as desired.

BRIEF DESCRIPTION OF THE DRAWINGS

Further advantages result from the following description of the figures. Five exemplary embodiments of the present invention are illustrated in the figures. The figures and the description contain numerous features in combination. Those skilled in the art will also advantageously consider the features individually and combine them into further meaningful combinations.

FIG. 2 shows a schematic illustration of a control and/or regulation unit for generating the optical marker, an output unit for visually generating the optical marker, and a detection unit for detecting the optical marker.

DETAILED DESCRIPTION OF EXAMPLE EMBODIMENTS

Figure 1:
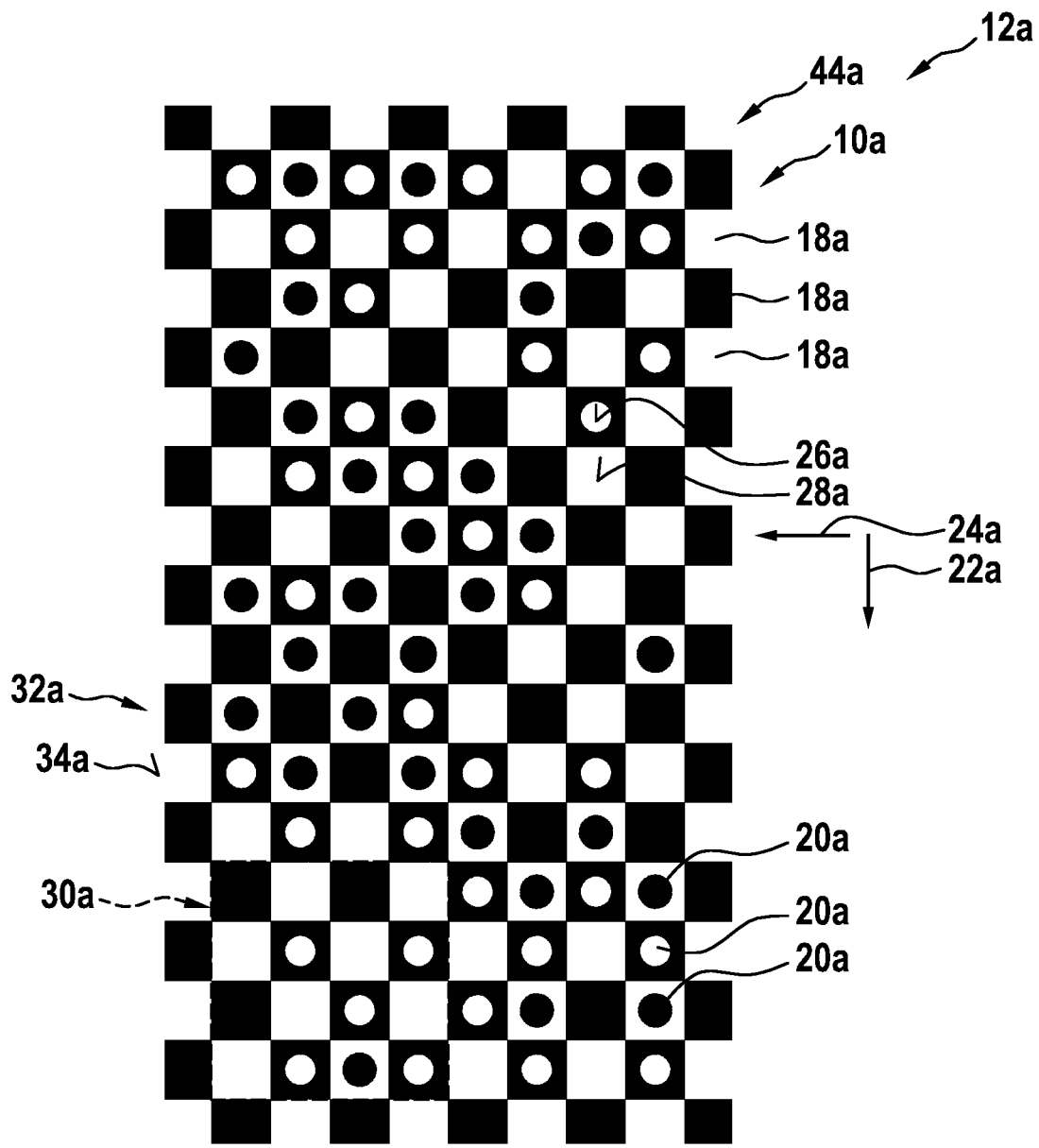
FIG. 1 shows a schematic illustration of a subarea of one exemplary embodiment of an optical marker that has been generated via a method according to the present invention and that is recognizable via a method according to the present invention.

FIG. 1 shows a subarea 10a of one exemplary embodiment of an optical marker 12a. Optical marker 12a has been generated with the aid of a method 14a for generating an optical marker 12a for image processing, for photogrammetry, and/or for motion detection with the aid of an output unit 96a and a control and/or regulation unit 94a (cf. FIG. 2). Optical marker 12a is preferably provided for being detected and recognized with the aid of a method 16a for recognizing an optical marker 12a for image processing, for photogrammetry, and/or for motion detection. Output unit 96a and control and/or regulation unit 94a are shown in FIG. 2. Optical marker 12a is formed by a regular pattern of a plurality of angular structures 18a, and by a plurality of substructures 20a. In each case at least two directly adjacent structures 18a, viewed in at least two mutually perpendicularly oriented directions 22a, 24a along a projection plane, which in particular in FIG. 1 corresponds to an image plane, of optical marker 12a have different colors, a color sequence of the plurality of structures 18a periodically repeating along the two directions 22a, 24a. Structures 18a have a checkerboard-like configuration. Structures 18a are in each case black or white. Substructures 20a are in each case situated completely within one of structures 18a. Substructures 20a each include an imaging surface 26a that corresponds to at least 15%, preferably at least 20%, and more preferably at least 24%, of a maximum of a projection surface 28a spanned by one of structures 18a. In particular, imaging surface 26a of individual substructures 20a corresponds at least essentially to 24.1% of projection surface 28a of individual structures 18a. Substructures 20a of optical marker 12a are each designed in the shape of a circular surface and are centrally situated within a structure 18a of the plurality of structures 18a. Imaging surface 26a of individual substructures 20a is designed as a circular surface. Projection surface 28a of individual structures 18a is designed as a surface area of a square. Substructures 20a each have a different color than structure 18a within which particular substructure 20a is situated. Substructures 20a are in each case black or white. In particular, substructures 20a that are situated in black structures 18a are white, and substructures 20a that are situated in white structures 18a are black. Optical marker 12a is formed from a plurality of minimum recognition areas 30a that are unique within optical marker 12a. Minimum recognition areas 30a are in each case formed from a plurality of adjacently situated structures 18a and in each case from at least one substructure 20a. In each case a square area of optical marker 12a spanned by 16 adjacently situated structures 18a forms a minimum recognition area 30a. Structures 18a forming a minimum recognition area 30a are in each case situated in a 4×4 matrix. However, other embodiments of minimum recognition areas 30a are possible. Optical marker 12a, in particular minimum recognition areas 30a, is/are designed in such a way that optical marker 12a, in particular minimum recognition areas 30a, is/are in each case unambiguously recognizable and associatable for a reflection and/or for a rotation about an angle that in particular corresponds to a natural multiple of $2\pi/n$. In FIG. 1, the angle (optical marker 12a, in particular minimum recognition areas 30a, for a rotation about the angle being unambiguously recognizable and associatable) corresponds to a multiple of 90°. Subarea 10a shown in FIG. 1 is preferably imaged on, in particular projected onto, an object 32a, in particular a marker device 32a. In particular, marker device/object 32a is designed as an object 32a to be detected via optical marker 12a for image processing, for photogrammetry, and/or for motion detection. A surface 34a of marker device/of object 32a onto which subarea 10a of optical marker 12a, in particular shown in FIG. 1, is imaged in particular has a flat-surface design. Other embodiments of optical marker 12a, in particular of structures 18a and/or of substructures 20a, are also possible, for example having different colors of structures 18a and/or of substructures 20a, with multiple different shapes of structures 18a and/or of substructures 20a, or the like. Structures 18a, in particular all structures 18a, of optical marker 12a in each case have identical designs. Structures 18a in each case have a square basic shape. Substructures 20a, in particular all substructures 20a, of optical marker 12a in each case have identical designs.

FIG. 2 shows exemplary embodiments of control and/or regulation unit 94a, of output unit 96a, of a detection unit 98a, and of an evaluation unit 100a. Control and/or regulation unit 94a includes in particular at least one processing unit 102a designed as a processor, as a microcontroller, as an FPGA, or the like, for in particular a procedural generation of optical marker 12a. Output unit 96a is designed here as an optical projector, for example, which is provided for projecting optical marker 12a onto object 32a, in particular surface 34a. However, it is also possible for output unit 96a to be designed as a display, as an illuminated structured field, or the like, which is designed as part of object 32a. Alternatively, it is possible for output unit 96a to be designed as a printer, as a punch, as a surface processing device such as a laser, or the like, and in particular to be provided for making optical marker 12a visible on object 32a, in particular surface 34a, for example by printing or the like. Control and/or regulation unit 94a is preferably at least temporarily connected to output unit 96a, in particular a piece of information from control and/or regulation unit 94a, which includes at least generated and output optical marker 12a, being transferred to output unit 96a. Detection unit 98a includes at least one sensor element 104a for detecting optical marker 12a on object 32a, in particular a subarea 10a of optical marker 12a imaged on object 32a. Sensor element 104a is preferably designed as a camera. However, other embodiments of detection unit 98a, in particular of sensor element 104a, are also possible. Detection unit 98a preferably includes a further sensor element 106a for detecting at least one surroundings parameter. Alternatively or additionally, it is possible for the at least one surroundings parameter to be detected with the aid of sensor element 104a of detection unit 98a. Evaluation unit 100a includes at least one processing unit 108a, designed as a processor, as a microcontroller, as an FPGA, or the like, for evaluating detected optical marker 12a, in particular detected subarea 10a of optical marker 12a.

Evaluation unit 100a is preferably connected to detection unit 98a. However, other embodiments of control and/or regulation unit 94a, of output unit 96a, of detection unit 98a, and/or of evaluation unit 100a are possible. For example, it is possible for control and/or regulation unit 94a and evaluation unit 100a to have a one-piece design. Alternatively or additionally, it is possible for output unit 96a and detection unit 98a to be provided/designed together, for example as part of a calibration system.

Figure 3:
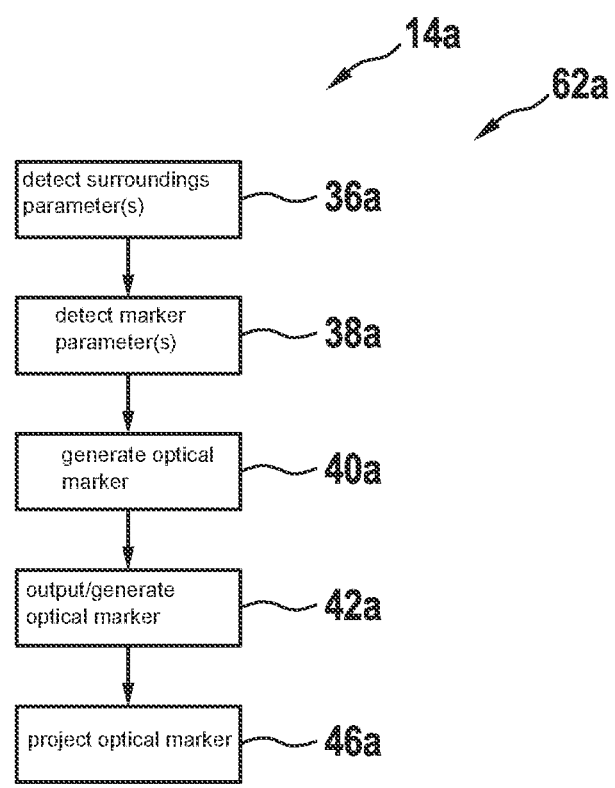
FIG. 3 shows a schematic illustration of an example of a sequence of the method according to the present invention for generating the optical marker.

FIG. 3 shows an example of a sequence of method 14a for generating optical marker 12a for image processing, for photogrammetry, and/or for motion detection with the aid of output unit 96a and with the aid of control and/or regulation unit 94a. At least one surroundings parameter is detected with the aid of detection unit 98a, in particular sensor element 104a and/or further sensor element 106a, in a method step 36a of method 14a. It is possible for at least one feature of an object 32a that is to be detected to be detected with the aid of optical marker 12a, using detection unit 98a. At least one marker parameter or a plurality of marker parameters is predefined by a user and/or as a function of the feature of object to be detected 32a with the aid of optical marker 12a that is detected via detection unit 98a in a further method step 38a of method 14a with the aid of a control unit.

Optical marker 12a is generated in a further method step 40a of method 14a with the aid of control and/or regulation unit 94a as a function of at least one predefined marker parameter, with the aid of a procedural generation, at least the marker parameter and/or at least one further marker parameter of optical marker 12a being adapted. Optical marker 12a is generated in a method step of method 14a, in particular method step 40a, with the aid of control and/or regulation unit 94a as a function of at least one surroundings parameter that is detected in particular with the aid of detection unit 98a, in particular automatically and/or with the aid of a procedural generation, at least one marker parameter of the optical marker being adapted. Optical marker 12a is generated with the aid of control and/or regulation unit 94a in such a way that optical marker 12a, in particular minimum recognition areas 30a, is/are unambiguously recognizable and associatable in each case for a reflection and/or for a rotation about an angle, which in particular corresponds to a natural multiple of 2π/n.

Optical marker 12a is output and/or generated in a further method step 42a of method 14a in such a way that represented optical marker 12a is formed by a regular pattern 44a of the plurality of angular structures 18a and by the plurality of substructures 20a, which in each case are situated, in particular completely, within one of structures 18a, in each case at least two directly adjacent structures 18a, viewed in two mutually perpendicularly oriented directions 22a, 24a along the projection plane of optical marker 12a, having different colors, a color sequence of the plurality of structures 18a periodically repeating along the two directions 22a, 24a, and optical marker 12a is formed from a plurality of minimum recognition areas 30a within optical marker 12a, which are in each case unique. Optical marker 12a is output and/or generated in a method step of method 14a, in particular method step 42a, in such a way that substructures 20a in each case include an imaging surface 26a that corresponds to at least 15%, preferably at least 20%, and preferably at least 24%, of maximum projection surface 28a spanned by structures 18a. Optical marker 12a is output and/or generated in a method step of method 14a, in particular method step 42a, in such a way that substructures 20a are in each case designed in the shape of a circular surface and centrally situated within a structure 18a of the plurality of structures 18a. Optical marker 12a is output and/or generated in a method step of method 14a, in particular method step 42a, in such a way that in each case a rectangular, in particular square, area of optical marker 12a that is spanned at least by 9, preferably at least by 12, and more preferably at least by 16, adjacently situated structures 18a forms a minimum recognition area 30a.

Alternatively, it is possible for optical marker 12a to be output and/or generated in a method step of method 14a, for example method step 42a, in such a way that structures 18a each have one of at least two colors and substructures 20a each have one of at least two other colors, in each case at least one color of the two colors having at least essentially the same brightness value as at least one other color of the two other colors, in particular the at least one color and the at least one other color being at least essentially indistinguishable via a grayscale recognition. In addition, it is possible for optical marker 12a to be generated with the aid of control and/or regulation unit 94a in such a way that in minimum recognition areas 30a of optical marker 12a, at least one piece of information in each case is transmitted via an arrangement of substructures 20a in particular minimum recognition area 30a or by a portion of substructures 20a situated within minimum recognition area 30a, in particular relative to structures 18a situated in minimum recognition area 30a.

Optical marker 12a is optically projected onto surface 34a of object 32a with the aid of output unit 96a in a further method step 46a of method 14a.

Figure 4:
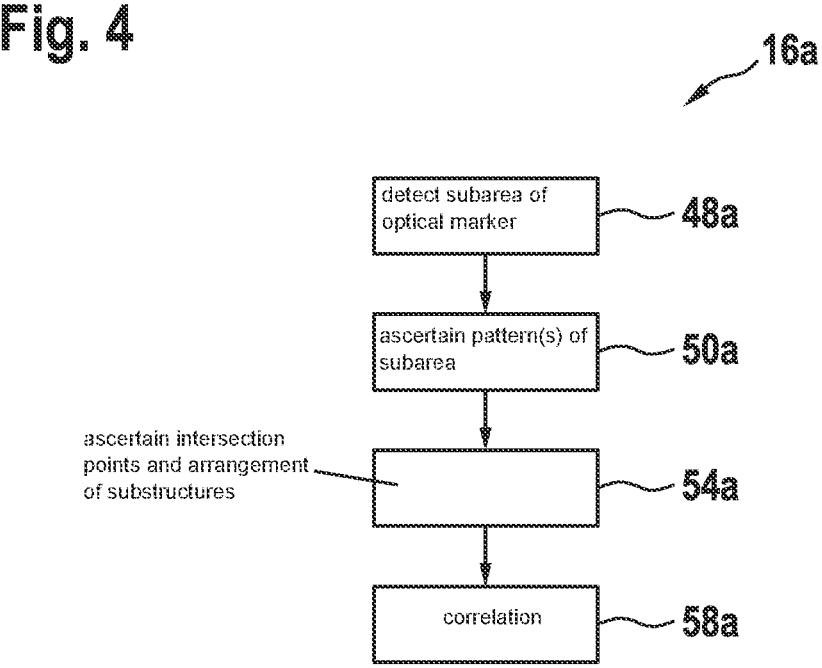
FIG. 4 shows a schematic illustration of an example of a sequence of the method according to the present invention for recognizing the optical marker.

FIG. 4 shows an example of a sequence of method 16a for recognizing optical marker 12a for image processing, for photogrammetry, and/or for motion detection. Subarea 10a of optical marker 12a that is visible on surface 34a is detected with the aid of detection unit 98a in a method step 48a of method 16a. Detected subarea 10a is preferably transmitted, in particular electronically, from detection unit 98a to evaluation unit 100a. At least one pattern 52a (cf. FIG. 6) of subarea 10a is ascertained with the aid of evaluation unit 100a, in particular as a function of detected subarea 10a, in a further method step 50a of method 16a. Intersection points 56a (cf. FIG. 5) of structures of optical marker 12a situated in subarea 10a and an arrangement of substructures 20a of optical marker 12a situated in pattern 52a are ascertained in a further method step 54a of method 16a with the aid of evaluation unit 100a for determining a position of subarea 10a within optical marker 12a and/or for ascertaining a design and/or a configuration of surface 34a via a color evaluation and/or contrast evaluation. It is preferably possible for structures 18a and substructures 20a in subarea 10a to be detected in each case independently of one another via a grayscale recognition or a color value recognition with the aid of detection unit 98a. For determining a position of subarea 10a within optical marker 12a, a correlation of ascertained pattern 52a of subarea 10a, in particular of ascertained intersection points 56a and/or of ascertained arrangement of substructures 20a, takes place in a further method step 58a of method 16a, using at least one reference pattern 60a (cf. FIG. 7) from a plurality of reference patterns 60a that are stored in particular in evaluation unit 100a, with the aid of evaluation unit 100a. For each possible position of ascertained pattern 52a of subarea 10a within optical marker 12a or of reference pattern 60a, in each case an error parameter is ascertained in a method step of method 16a, in particular method step 58a, with the aid of evaluation unit 100a, the position of subarea 10a within optical marker 12a being determined as a function of the ascertained error parameters.

A method 62a for image processing, for photogrammetry, and/or for motion detection (optical marker 12a being generated according to method 14a, described in particular in the description for FIG. 3, for generating an optical marker 12a, and optical marker 12a being recognized according to method 16a, described in particular in the description for FIG. 4, for recognizing an optical marker 12a) is preferably possible via a combination of the two methods 14a, 16a, in particular described in the descriptions for FIGS. 3 and 4. Object 32a, which images optical marker 12a, in particular subarea 10a of optical marker 12a, is preferably [formed] by method(s) 14a, 16a, 62a into a marker device 32a for image processing, for photogrammetry, and/or for motion detection.

Figure 5:
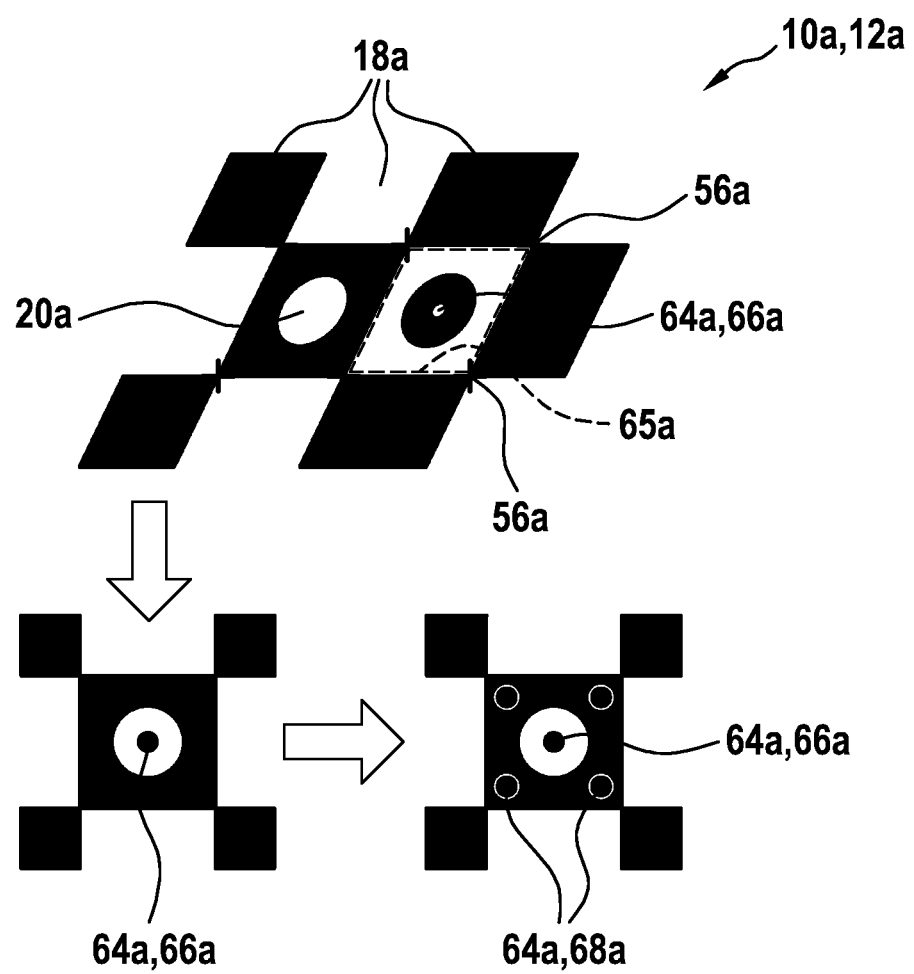
FIG. 5 shows a schematic diagram for a detection method for structures and substructures of the optical marker.

FIG. 5 schematically shows a detection method for ascertaining pattern 52a of detected subarea 10a of optical marker 12a, in particular of intersection points 56a of structures 18a and the arrangement of substructures 20a within structures 18a, with the aid of evaluation unit 100a. In particular, an ascertainment of the arrangement of substructures 20a in subarea 10a takes place as a function of detected intersection points 56 of structures 18a in subarea 10a. For ascertaining the arrangement of substructures 20a in subarea 10a, in particular as a function of a shape and/or an arrangement of structures 18a of optical marker 12a, at least one color value, one grayscale, and/or one contrast value at at least one point 64a relative to intersection points 56a is preferably determined with the aid of detection unit 98a and compared to at least one reference value. For the checkerboard-like design of structures 18a of optical marker 18a, intersection points 56a at the corners of square structures 18a in subarea 10a, which in particular form a grid configuration including square unit cells 65a, are ascertained with the aid of detection unit 98a. In each case a geometric midpoint 66a of individual unit cells 65a of the grid configuration is preferably ascertained as a function of ascertained intersection points 56a. Corner points 68a of structures 18a are determined in each case in the direction of intersection points 56a surrounding midpoint 66a, as a function of geometric midpoint 66a of unit cells 65a. An arrangement of a substructure 20a within structure 18a is determined by determining a contrast value between geometric midpoint 66a of unit cell 65a and corner points 68a of particular structure 18a that surround particular geometric midpoint 66a, with the aid of evaluation unit 100a. If no contrast or a contrast value below a stored limit value is ascertained for corner points 68a of structure 18a and geometric midpoint 66a, no substructure 20a is detected within particular structure 18a. If the ascertained contrast value exceeds the stored limit value, which is the case in particular for midpoint 66a shown in FIG. 5, a substructure 20a is recognized within particular structure 18a. It is also possible for a color of particular structure 18a to be detected in each case via ascertained color values, grayscales, and/or contrast values in corner points 68a of square unit cells 65a. In addition, it is possible for a color of particular substructure 20a to be detected in each case via ascertained color values, grayscales, and/or contrast values in geometric midpoints 66a of square unit cells 65a, or for the presence of a substructure 20a in particular structure 18a to be ascertained. Ascertained pattern 52a preferably includes at least one arrangement of structures 18a without substructures 20a, in particular situated within structures 18a, and of structures 18a with substructure 20a, in particular situated within structures 18a, within subarea 10a.

Figure 6:
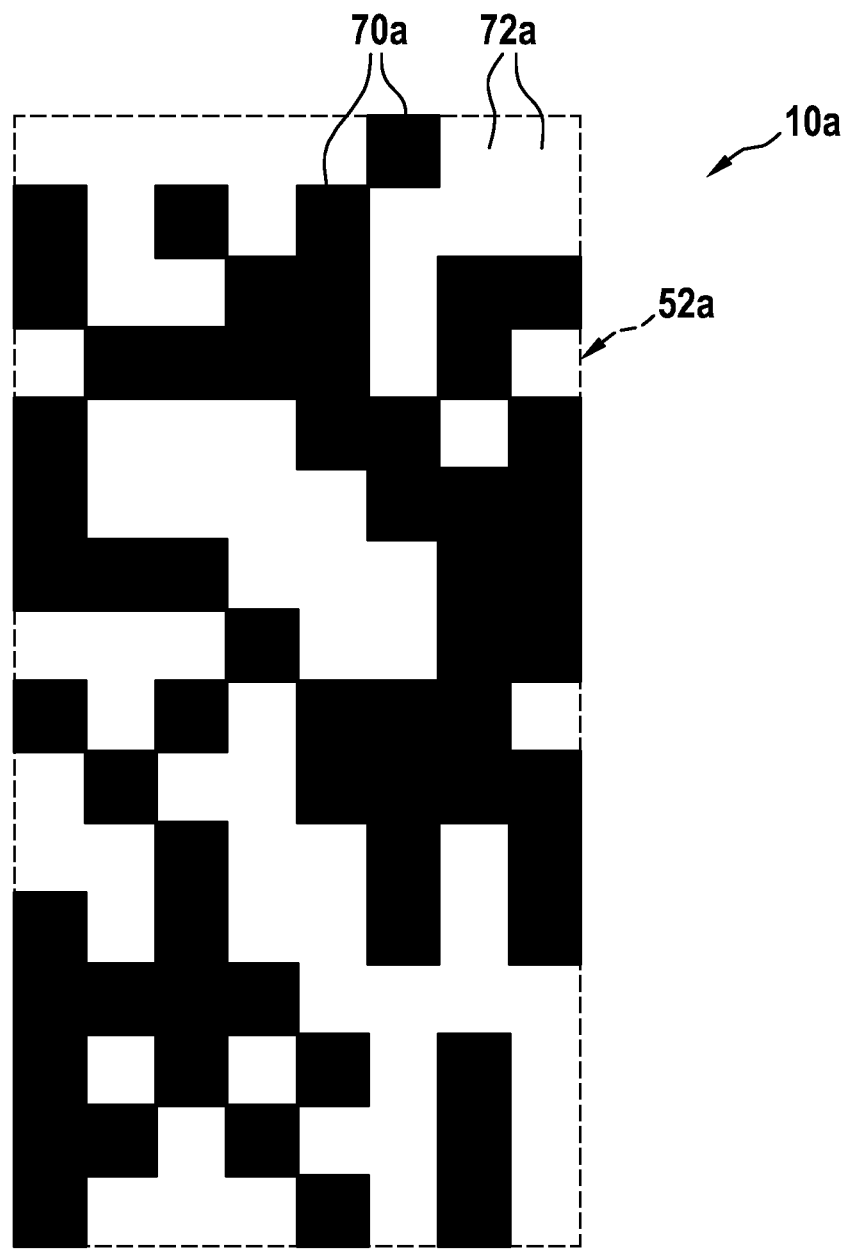
FIG. 6 shows a pattern of the subarea of the optical marker which is encoded after a detection.

FIG. 6 shows pattern 52a of detected subarea 10a of optical marker 12a, which is ascertained via evaluation unit 100a. If a substructure 20a is ascertained within a structure 18a of optical marker 12a according to the detection method described in particular in FIG. 5, with the aid of evaluation unit 100a, particular structure 18a within pattern 52a is marked in one color. If no substructure 20a is ascertained within a structure 18a of optical marker 12a according to the detection method described in particular in FIG. 5, with the aid of evaluation unit 100a, particular structure 18a within pattern 52a is marked in another color. In particular, ascertained pattern 52a is formed from a plurality of color fields 70a, 72a, each of which images the arrangement of structures 18a of subarea 10a, and which in each case has the color or the other color. Color fields 70a of the plurality of color fields 70a, 72a preferably have the color, and other color fields 72a of the plurality of color fields 70a, 72a have the other color.

Figure 7:
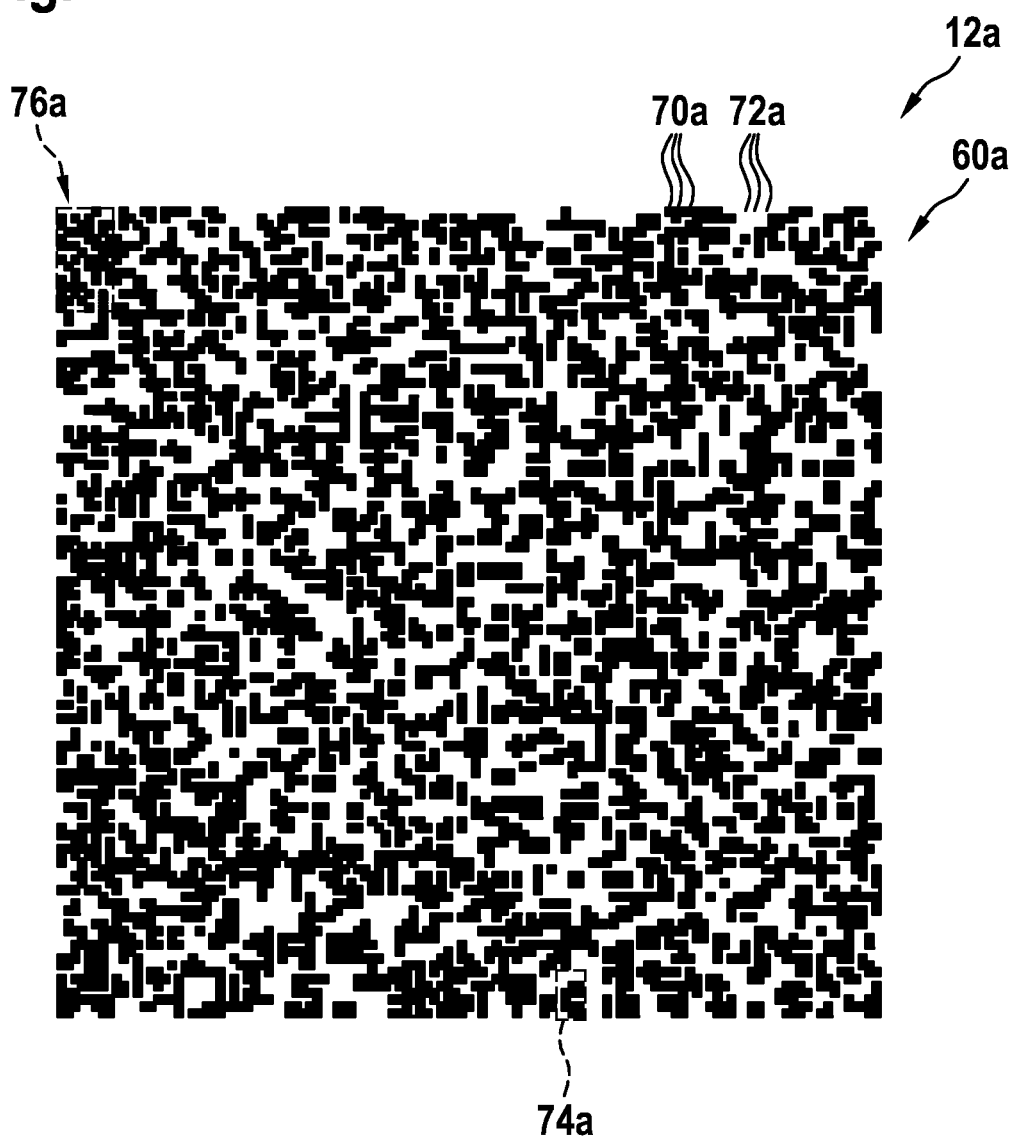
FIG. 7 shows a reference pattern of the optical marker for an association of the detected subarea of the optical marker.

FIG. 7 completely shows one of reference patterns 60a of optical marker 12a. Reference pattern 60a is formed, in particular analogously to ascertained pattern 52a, from color fields 70a, 72a, each of which images the arrangement of structures 18a of optical marker 12a, and in each case has the color or the other color, in particular as a function of an arrangement of a substructure 20a within particular structure 18a. For determining a position of detected subarea 10a within optical marker 12a, a correlation of ascertained pattern 52a of subarea 10a with reference pattern 60a, in particular with a plurality of reference patterns 60a, takes place with the aid of evaluation unit 100a. For each possible position of ascertained pattern 52a of subarea 10a within optical marker 12a or of reference pattern 60a, an error parameter is ascertained in each case with the aid of evaluation unit 100a, the position of subarea 10a within optical marker 12a or of reference pattern 60a being determined as a function of the ascertained error parameters. During a comparison of ascertained pattern 52a (cf. FIG. 6) to reference pattern 60a, for each possible position of ascertained pattern 52a within reference pattern 60a an arrangement of color fields 70a, 72a of ascertained pattern 52a and of reference pattern 60a that are superposed at the particular position are preferably compared, in particular in the event of differing color fields 70a, 72a at a position of a structure 18a, in each case a value of the error parameter associated with this position of pattern 52a being increased by a fixed value, for example 1. With the aid of evaluation unit 100a, subarea 10a is preferably associated with a position within optical marker 12a, which of all possible positions has a smallest value of the error parameter. The error parameter is preferably ascertained for each possible position of subarea 10a within optical marker 12a via a comparison of ascertained pattern 52a of subarea 10a to a reference area 74a (shown in FIG. 7 by way of example) of the/a reference pattern 60a. In particular, reference area 74a is designed in such a way that reference area 74a and ascertained pattern 52a of subarea 10a have identical shapes, in particular with regard to an arrangement and the number of structures 18a. For example, the error parameter in each case corresponds to the number of nonmatching structures 18a and/or substructures 20a in ascertained pattern 52a of subarea 10a relative to particular reference area 74a. The possible positions of ascertained pattern 52a of subarea 10a within optical marker 12a are preferably ascertained with the aid of evaluation unit 100a, in particular prior to ascertaining the error parameters, as a function of a shape of ascertained pattern 52a of subarea 10a and of a basic shape of reference pattern 60a of optical marker 12a and/or of optical marker 12a. In the embodiment of ascertained pattern 52a and of reference pattern 60a shown in FIGS. 6 and 7, a position 76a of ascertained subarea 10a within optical marker 12a at the upper left corner of optical marker 12a is preferably determined. For determining the position of detected subarea 10a within optical marker 12a, ascertained pattern 52a is preferably compared to a plurality of reference patterns 60a, the reference patterns 60a in each case corresponding, for example, to a reflected or rotated optical marker 12a.

Further exemplary embodiments of the present invention are shown in FIGS. 8 through 11. The following descriptions and the drawings are limited essentially to the differences between the exemplary embodiments; with regard to components that are denoted in the same way, in particular with regard to components having the same reference numerals, reference may basically also be made to the drawings and/or the description of the other exemplary embodiments, in particular in FIGS. 1 through 7. To distinguish between the exemplary embodiments, the letter "a" is added as a suffix to the reference numerals of the exemplary embodiment in FIGS. 1 through 7. In the exemplary embodiments in FIGS. 8 through 11, the letter "a" is replaced by the letters "b" through "e." In particular, the optical markers described in FIGS. 8 through 11 have been output and/or generated, with the aid of a method for generating optical markers (cf. FIG. 3) with the aid of an output unit 96a and/or a control and/or regulation unit 94a, in such a way that they each include one shown embodiment.

Figure 8:
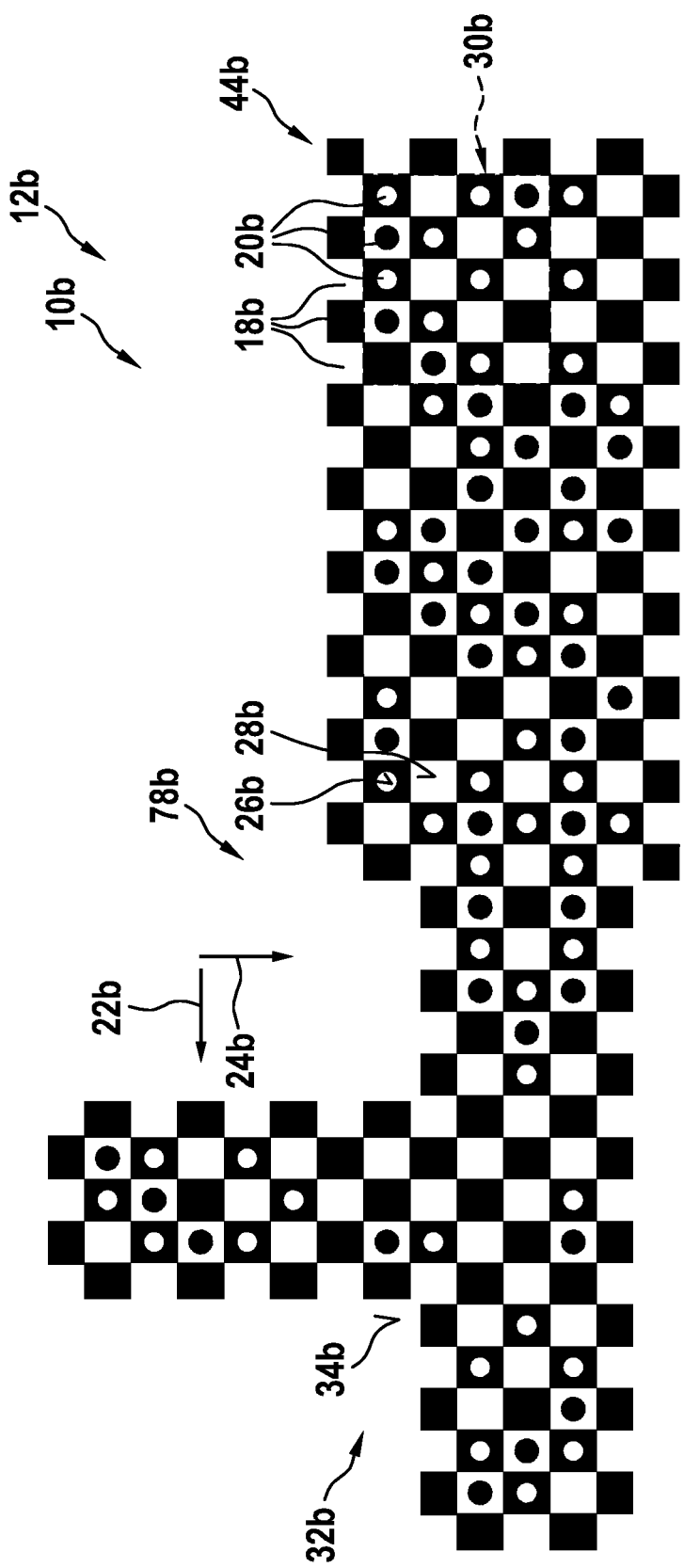
FIG. 8 shows a schematic illustration of a first alternative embodiment of the optical marker, including an example of a basic shape that is adapted to an object to be detected.

FIG. 8 shows a first alternative embodiment of an optical marker 12b. Optical marker 12b has been generated, in particular analogously to method 14a designed as described in FIG. 3, with the aid of a method for generating an optical marker 12b for image processing, for photogrammetry, and/or for motion detection, with the aid of an output unit and a control and/or regulation unit (not shown in FIG. 8). Optical marker 12b is preferably provided for being detected and recognized with the aid of a method, in particular designed analogously to method 16a described in FIG. 4, for recognizing an optical marker 12b for image processing, for photogrammetry, and/or for motion detection. Illustrated optical marker 12b is formed by a regular pattern 44b of a plurality of angular structures 18b and by a plurality of substructures 20b, each of which is situated completely within one of structures 18b, in each case at least two directly adjacent structures 18b, viewed in at least two mutually perpendicularly oriented directions 22b, 24b along a projection plane of optical marker 12b, having different colors, and a color sequence of the plurality of structures 18b along the two directions 22b, 24b periodically repeating. Optical marker 12b is formed from a plurality of minimum recognition areas 30b within optical marker 12b, which are in each case unique. Substructures 20b each include an imaging surface 26b that corresponds to at least 15%, preferably at least 20%, and more preferably at least 24%, of a maximum projection surface 28b spanned by one of structures 18b. Optical marker 12b illustrated in FIG. 8 has a design that is at least essentially analogous to optical marker 12a described in the description of FIGS. 1 through 7, so that with regard to a design of optical marker 12b illustrated in FIG. 8, reference may be made at least essentially to the description of FIGS. 1 through 7. In contrast to optical marker 12a described in the description of FIGS. 1 through 7, optical marker 12b illustrated in FIG. 8 preferably has another basic shape 78b that is different from a square basic shape. Basic shape 78b of optical marker 12b has preferably been adapted with the aid of the control and/or regulation unit as a function of a design of an object 32b to be detected, or created as a function of a plurality of detected subareas 10b and/or patterns, via a procedural generation.

Figure 9:
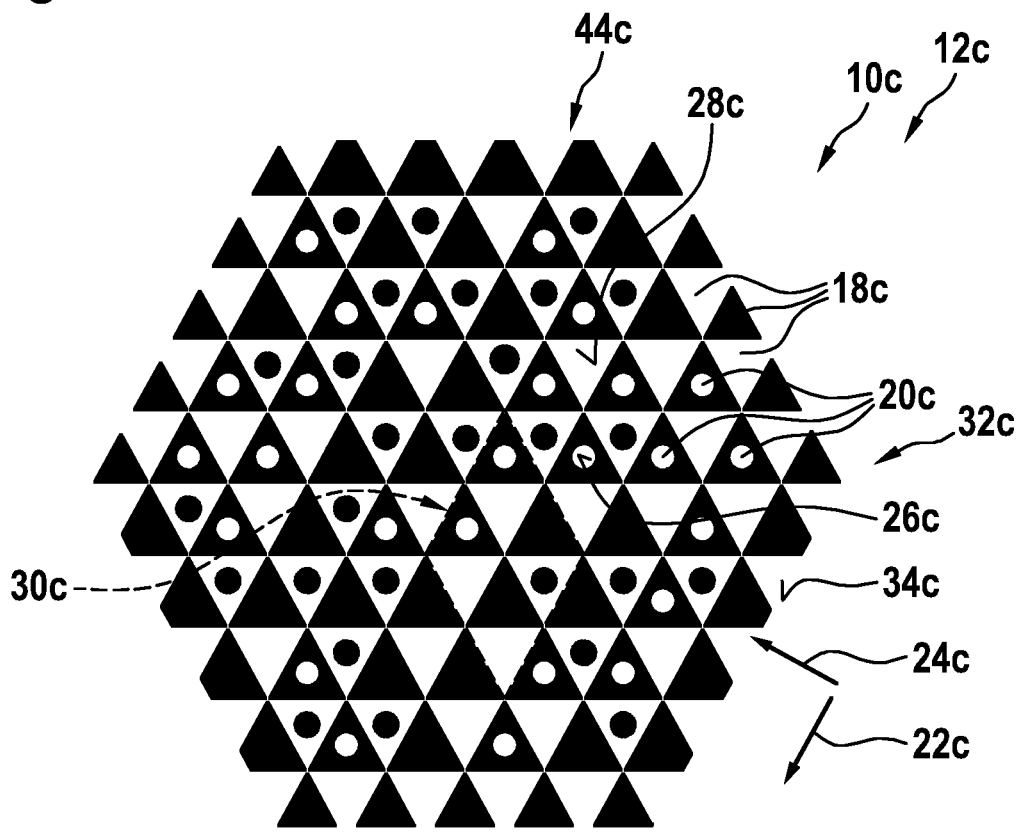
FIG. 9 shows a schematic illustration of an example of a subarea of a second alternative embodiment of an optical marker including triangular structures.

FIG. 9 shows a second alternative embodiment of an optical marker 12c. Optical marker 12c has been generated, in particular analogously to method 14a described in FIG. 3, with the aid of a method for generating an optical marker 12c for image processing, for photogrammetry, and/or for motion detection, with the aid of an output unit and a control and/or regulation unit (not shown in FIG. 9). Optical marker 12c is preferably provided for being detected and recognized with the aid of a method, in particular designed analogously to method 16a described in FIG. 4, for recognizing an optical marker 12c for image processing, for photogrammetry, and/or for motion detection. Illustrated optical marker 12c is formed by a regular pattern 44c of a plurality of angular structures 18c and by a plurality of substructures 20c, each of which is situated completely within one of structures 18c, in each case at least two directly adjacent structures 18c, viewed in at least two mutually perpendicularly oriented directions 22c, 24c along a projection plane of optical marker 12c, having different colors, and a color sequence of the plurality of structures 18c along the two directions 22c, 24c periodically repeating. Optical marker 12c is formed from a plurality of minimum recognition areas 30c within optical marker 12c, which are in each case unique. Substructures 20c each include an imaging surface 26c that corresponds to at least 15%, preferably at least 20%, and more preferably at least 24%, of a maximum projection surface 28c spanned by one of structures 18c. Optical marker 12c illustrated in FIG. 9 has a design that is at least essentially analogous to optical marker 12a described in the description of FIGS. 1 through 7, so that with regard to a design of optical marker 12c illustrated in FIG. 9, reference may be made at least essentially to the description of FIGS. 1 through 7. In contrast to optical marker 12a described in the description of FIGS. 1 through 7, angular structures 18c of optical marker 12c illustrated in FIG. 9 preferably have a triangular basic shape in each case. In particular, the basic shape of individual structures 18c is designed as an equilateral triangle. Projection surface 28c of individual structures 18c of optical marker 12c is designed as a surface area of an equilateral triangle. Optical marker 12c is preferably output and/or generated in a method step of the method in such a way that angular structures 18c each have a triangular basic shape.

Figure 10:
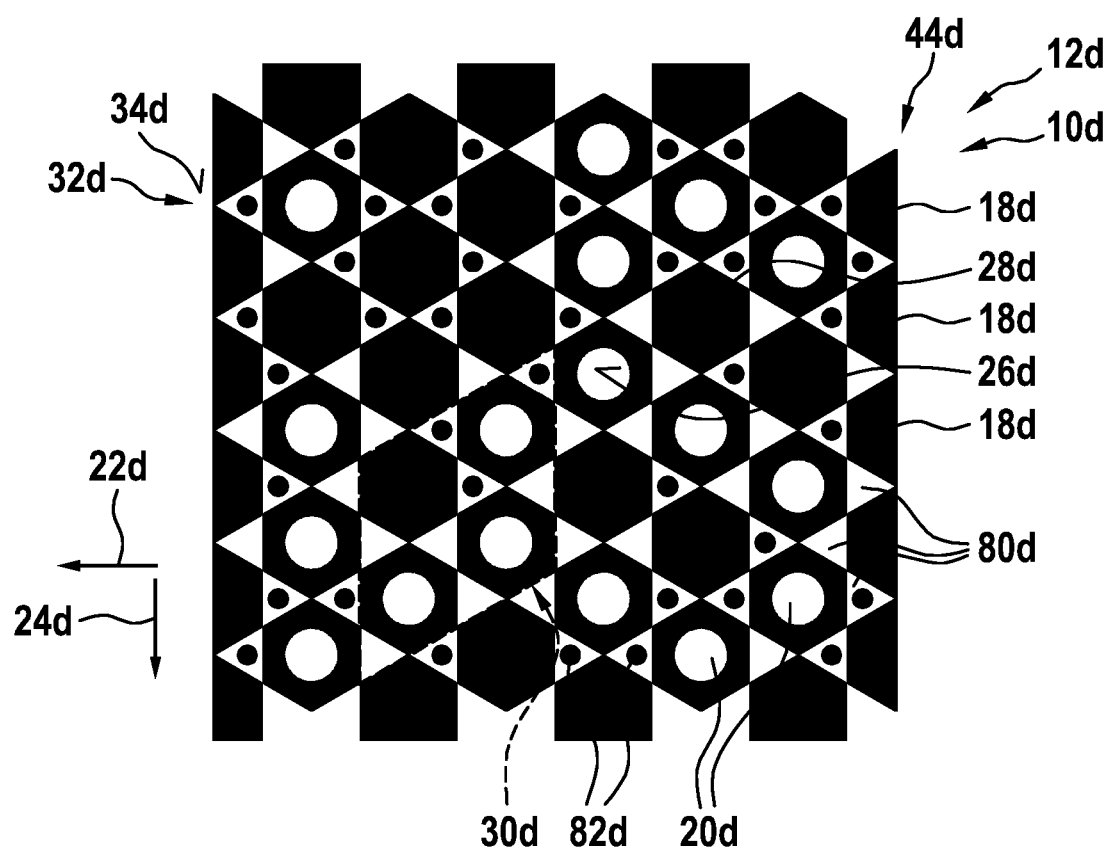
FIG. 10 shows a schematic illustration of an example of a subarea of a third alternative embodiment of an optical marker, including structures having two different types of design and substructures having two different types of design.

FIG. 10 shows a third alternative embodiment of an optical marker 12d. Optical marker 12d has been generated with the aid of a method, in particular analogously to method 14a described in FIG. 3, for generating an optical marker 12d for image processing, for photogrammetry, and/or for motion detection, with the aid of an output unit and a control and/or regulation unit (not shown in FIG. 10). Optical marker 12d is preferably provided for being detected and recognized with the aid of a method, in particular designed analogously to method 16a described in FIG. 4, for recognizing an optical marker 12d for image processing, for photogrammetry, and/or for motion detection. Illustrated optical marker 12d is formed by a regular pattern 44d of a plurality of angular structures 18d, 80d and by a plurality of substructures 20d, 82d, each of which is situated completely within one of structures 18d, 80d, in each case at least two directly adjacent structures 18d, 80d, viewed in at least two mutually perpendicularly oriented directions 22d, 24d along a projection plane of optical marker 12d, having different colors, and a color sequence of the plurality of structures 18d, 80d along the two directions 22d, 24d periodically repeating. Optical marker 12d is formed from a plurality of minimum recognition areas 30d within optical marker 12d, which are in each case unique. Substructures 20d, 82d each include an imaging surface 26d that corresponds to at least 15%, preferably at least 20%, and more preferably at least 24%, of a maximum projection surface 28d spanned by one of structures 18d, 80d. Optical marker 12d illustrated in FIG. 10 has a design that is at least essentially analogous to optical marker 12a described in the description of FIGS. 1 through 7, so that with regard to a design of optical marker 12d illustrated in FIG. 10, reference may be made at least essentially to the description of FIGS. 1 through 7. In contrast to optical marker 12a described in the description of FIGS. 1 through 7, substructures 20d, 82d and structures 18d, 80d of optical marker 12d illustrated in FIG. 10 preferably have one of two different basic shapes in each case. Structures 18d, 80d of optical marker 12d each have a hexagonal basic shape or a triangular basic shape. Structures 18d, 80d of optical marker 12d are situated and/or designed in such a way that structures 18d, 80d are seamlessly situated next to one another. A structure 80d having a triangular basic shape is preferably situated in each case between three structures 18d, in particular adjacently situated via a corner, that have a hexagonal basic shape, and in particular is completely surrounded by structures 18d having a hexagonal basic shape. Substructures 20d, 82d of optical marker 12d each have a circular surface-shaped basic shape. First substructures 20d of substructures 20d, 82d of optical marker 12d are each situated within a structure 18d having a hexagonal basic shape, second substructures 82d of substructures 20d, 82d of optical marker 12d each being situated within a structure 80d having a triangular basic shape. First substructures 20d each have a larger imaging surface 26d than do second substructures 82d. In particular, individual substructures 20d, 82d each include an imaging surface 26d that corresponds to at least 15%, preferably at least 20%, and more preferably at least 24%, of a maximum projection plane 28d of a structure 18d, 80d within which particular substructure 20d, 82d is situated. Optical marker 12d is preferably output and/or generated in one method step of the method in such a way that angular structures 80d each have a triangular basic shape.

Figure 11:
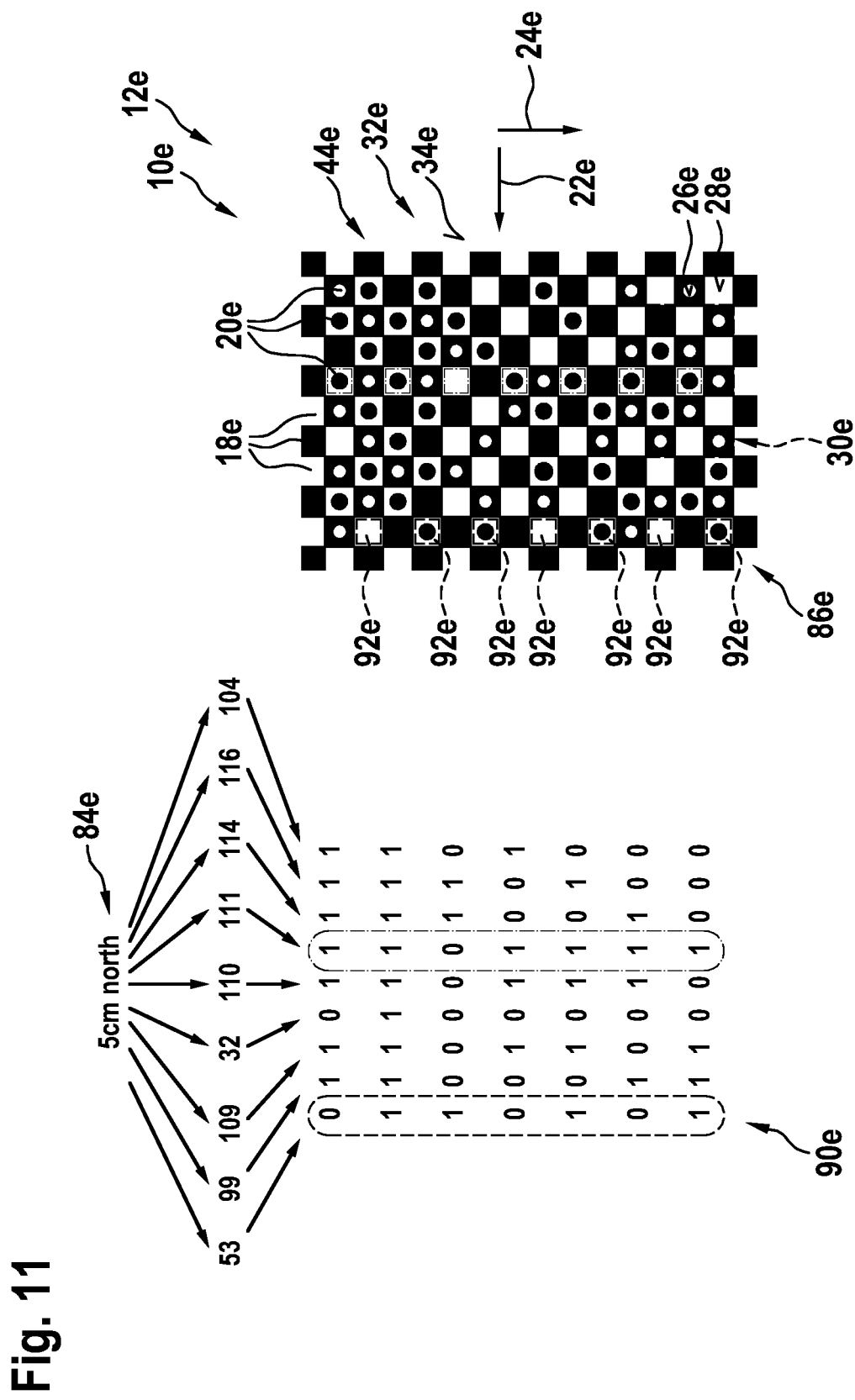
FIG. 11 shows a schematic illustration of an example of a subarea of a fourth alternative embodiment of an optical marker, including a piece of information that is encoded into the optical marker via an arrangement of substructures of the optical marker.

FIG. 11 shows a fourth alternative embodiment of an optical marker 12e. Optical marker 12e has been generated with the aid of a method, in particular analogously to method 14a described in FIG. 3, for generating an optical marker 12e for image processing, for photogrammetry, and/or for motion detection, with the aid of an output unit and a control and/or regulation unit (not shown in FIG. 11). Optical marker 12e is preferably provided for being detected and recognized with the aid of a method, in particular designed analogously to method 16a described in FIG. 4, for recognizing an optical marker 12e for image processing, for photogrammetry, and/or for motion detection. Illustrated optical marker 12e is formed by a regular pattern 44e of a plurality of angular structures 18e, 92e and by a plurality of substructures 20e, each of which is situated completely within one of structures 18e, 92e, in each case at least two directly adjacent structures 18e, 92e, viewed in at least two mutually perpendicularly oriented directions 22e, 24e along a projection plane of optical marker 12e, having different colors, and a color sequence of the plurality of structures 18e, 92e along the two directions 22e, 24e periodically repeating. Optical marker 12e is formed from a plurality of minimum recognition areas 30e within optical marker 12e, which are in each case unique. Substructures 20e each include an imaging surface 26e that corresponds to at least 15%, preferably at least 20%, and more preferably at least 24%, of a maximum projection surface 28e spanned by one of structures 18e, 92e. Optical marker 12e illustrated in FIG. 11 has a design that is at least essentially analogous to optical marker 12a described in the description of FIGS. 1 through 7, so that with regard to a design of optical marker 12e illustrated in FIG. 11, reference may be made at least essentially to the description of FIGS. 1 through 7. In contrast to optical marker 12a described in the description of FIGS. 1 through 7, optical marker 12e illustrated in FIG. 11 is preferably designed in such a way that in minimum recognition areas 30e of optical marker 12e, at least one piece of information 84e is transmitted in each case via an arrangement of substructures 20e in particular minimum recognition area 30e or by a portion of substructures 20e situated within minimum recognition area 30e, in particular relative to structures 18e, 92e situated in minimum recognition area 30e and/or of further substructures 20e. Piece of information 84e includes a geometric size, in particular a width, of structures 18e, 92e within the optical marker 12e, viewed in a fixed projection plane relative to the output unit. It is possible for piece of information 84e to additionally include a reference plane, such as the projection plane mentioned above, for which the geometric size is valid. Substructures 20e transmitting piece of information 84e are arranged in a predefined pattern 86e and at a predefined distance 88e within optical marker 12e, in particular substructures 20e outside such a pattern 86e not contributing to a transmission of piece of information 84e. Distance 88e corresponds, for example, to a width of one of structures 18e, 92e of optical marker 12e. In particular, predefined pattern 86e is stored in the control and/or regulation unit and/or a detection unit (not shown in FIG. 11) in at least one method step. Piece of information 84e is preferably encoded into each minimum recognition area 30e of optical marker 12e via an arrangement of substructures 20e, with the aid of the control and/or regulation unit. Via the width of structures 18e, 92e in the projection plane, which is transmittable via piece of information 84e, a distance from an object 32e to be considered, which in particular images subarea 10e, and/or a size of object 32e to be considered, may be ascertained, for example, via an image evaluation of a detected subarea 10e of optical marker 12e. Piece of information 84e, by way of example in the exemplary embodiment shown in FIG. 11, is translated via an American Standard Code for Information Interchange (ASCII) code and converted into a binary sequence 90e, which is encoded into optical marker 12e via pattern 86e, which is designed in each case as an in-series arrangement of single-color structures 92e. Structures 92e of this pattern 86e without a substructure in each case image a binary 0, while structures 92e of this pattern 86e with a substructure 20e in each case image a binary 1. Other methods of encoding piece of information 84e into optical marker 12e are also possible, for example via an in-series arrangement of adjacently situated structures 18e, 92e, via a diagonally adjacently situated row of structures 18e, 92e, or the like.

What is claimed is:

1. A method for generating an optical marker for image processing, and/or for photogrammetry, and/or for motion detection using a device that includes: (i) at least one output unit, and/or (ii) at least one control and/or regulation unit, the method comprising the following steps:

outputting and/or generating the optical marker in such a way that the optical marker is formed by a regular pattern of a plurality of angular structures and by a plurality of substructures, each of the substructures being situated completely within one of the structures, each of at least one of the structures being adjacent to at least one respective directly adjacent structure in each of two mutually perpendicularly oriented directions along a projection plane of the optical marker, a respective color of each of the respective directly adjacent structures being different than the respective one of the structures to which they are adjacent, a color sequence of the plurality of structures periodically repeating along the at least two mutually perpendicularly oriented directions, and the optical marker being formed from a plurality of minimum recognition areas within the optical marker which are each case unique;

wherein:

the optical marker is output and/or generated in such a way that the substructures each include an imaging surface that corresponds to at least 15% of a maximum projection surface spanned by one of the structures; and the method includes at least one of the following three features (a)-(c):

(a) the method further comprises detecting a surroundings of the device, the optical marker being generated by adapting a predefined parameter of an initial optical marker based on the detected surroundings;

(b) the outputting and/or generating of the optical marker is performed such that at least one of:

(i) each of the plurality of structures has a respective plurality of corners, and each of the substructures has a shape without corners whose center point is positioned on a point of a geometric centroid of a respective one of the structures; and (ii) the structures each have one of at least two colors and the substructures each have one of at least two other colors, in each case at least one color of the at least two colors having at least essentially the same brightness value as at least one other color of the at least two other colors, the at least one color and the at least one other color being at least indistinguishable via a grayscale recognition; and (c) the optical marker is generated using the control and/or regulation unit in such a way that each of the minimum recognition areas, for a reflection and/or for a rotation about an angle that corresponds to a natural multiple of $2\pi/n$, is unambiguously recognizable and associable.

2. The method as recited in claim 1, wherein in at least one method step, the optical marker is output and/or generated in such a way that, each of the minimum recognition areas is formed by a square area of the optical marker that is spanned at least by 9 adjacently situated structures of the structures.

3. The method as recited in claim 1, wherein the outputting and/or generating of the optical marker is performed such that the structures each have the one of the at least two colors and the substructures each have the one of the at least two other colors, in each case the at least one color of the at least two colors having at least essentially the same brightness value as the at least one other color of the at least two other colors, the at least one color and the at least one other color being at least indistinguishable via the grayscale recognition.

4. The method at least as recited in claim 1, wherein the optical marker is generated using the control and/or regulation unit in such a way that the each of the minimum recognition areas, for the reflection and/or for the rotation about the angle that corresponds to the natural multiple of $2\pi/n$, is unambiguously recognizable and associable.

5. The method as recited in claim 1, wherein in at least one method step, the optical marker is optically projected onto a surface of an object using the output unit.

6. The method as recited in claim 1, wherein the optical marker is generated using the control and/or regulation unit in such a way that, with respect to each respective one of the minimum recognition areas of the optical marker, at least one piece of information is transmitted via an arrangement of the substructures in the respective minimum recognition area or by a portion of the substructures situated within the respective minimum recognition area, relative to the structures situated in the respective minimum recognition area.

7. The method as recited in claim 1, wherein in at least one method step, the optical marker is output and/or generated in such a way that the angular structures each have a triangular basic shape.

8. The method as recited in claim 1, wherein the method further comprises the detecting of the surroundings of the device, and the optical marker is generated by the adapting of the predefined parameter of the initial optical marker based on the detected surroundings.

9. The method as recited in claim 1, wherein the outputting and/or generating of the optical marker is performed such that each of the plurality of structures has the respective plurality of corners, and each of the substructures has the shape without corners whose center point is positioned on the point of the geometric centroid of the respective one of the structures.

10. A method for recognizing an optical marker for image processing, and/or for photogrammetry, and/or for motion detection, the optical marker being formed by a regular pattern of a plurality of angular structures and by a plurality of substructures, each of the substructures being situated completely within one of the structures, each of at least two directly adjacent structures, viewed in at least two mutually perpendicularly oriented directions along a projection plane of the optical marker, having different colors, a color sequence of the plurality of structures periodically repeating along the at least two mutually perpendicularly oriented direction, and the optical marker being formed from a plurality of minimum recognition areas within the optical marker which are each case unique, wherein the substructures each include an imaging surface that corresponds to at least 15% of a maximum projection surface spanned by one of the structures, the method comprising the following steps:

detecting, using at least one detection unit, at least one subarea of the optical marker that is visible on a surface;

ascertaining at least one pattern of the subarea using at least one evaluation unit; and ascertaining intersection points of the structures of the optical marker situated in the subarea and ascertaining an arrangement of the substructures of the optical marker situated in the pattern, using the evaluation unit, for determining a position of the subarea within the optical marker and/or for ascertaining a design and/or a configuration of the surface via a color evaluation and/or contrast evaluation.

11. The method as recited in claim 10, wherein in at least one method step, for determining a position of the subarea within the optical marker, a correlation of the ascertained pattern of the ascertained intersection points and/or of the ascertained arrangement of the substructures, takes place using at least one reference pattern from a plurality of stored reference patterns, using the evaluation unit.

12. The method as recited in claim 11, wherein in at least one method step, an error parameter is ascertained, using the evaluation unit, for each possible position of the ascertained pattern of the subarea within the optical marker, the position of the subarea within the optical marker being determined as a function of the ascertained error parameters.

13. A method for image processing, and/or for photogrammetry, and/or for motion detection, the method comprising:

generating an optical marker in such a way that the optical marker is formed by a regular pattern of a plurality of angular structures and by a plurality of substructures, each of the substructures being situated completely within one of the structures, each of at least two directly adjacent structures, viewed in at least two mutually perpendicularly oriented directions along a projection plane of the optical marker, having different colors, a color sequence of the plurality of structures periodically repeating along the at least two mutually perpendicularly oriented direction, and the optical marker being formed from a plurality of minimum recognition areas within the optical marker which are each case unique; wherein the optical marker is output and/or generated in such a way that the substructures each include an imaging surface that corresponds to at least 15% of a maximum projection surface spanned by one of the structures; and recognizing the optical marker by:

detecting, using at least one detection unit, at least one subarea of the optical marker that is visible on a surface, ascertaining at least one pattern of the subarea using at least one evaluation unit, and ascertaining intersection points of the structures of the optical marker situated in the subarea and ascertaining an arrangement of the substructures of the optical marker situated in the pattern, using the evaluation unit, for determining a position of the subarea within the optical marker and/or for ascertaining a design and/or a configuration of the surface via a color evaluation and/or contrast evaluation.

14. A marker device for image processing, for photogrammetry, and/or for motion detection, the device including:
at least one optical marker generated in such a way that the optical marker is formed by a regular pattern of a plurality of angular structures and by a plurality of substructures, each of the substructures being situated completely within one of the structures, each of at least two directly adjacent structures, viewed in at least two mutually perpendicularly oriented directions along a projection plane of the optical marker, having different colors, a color sequence of the plurality of structures periodically repeating along the at least two mutually perpendicularly oriented direction, and the optical marker being formed from a plurality of minimum recognition areas within the optical marker which are each case unique;
wherein:
the substructures each include an imaging surface that corresponds to at least 15% of a maximum projection surface spanned by one of the structures; and
the marker device includes at least one of the following three features (a)-(c):
   (a) each of the plurality of structures has a respective plurality of corners, and each of the substructures has a shape without corners whose center point is positioned on a point of a geometric centroid of a respective one of the structures;
   (b) the structures each have one of at least two colors and the substructures each have one of at least two other colors, in each case at least one color of the at least two colors having at least essentially the same brightness value as at least one other color of the at least two other colors, the at least one color and the at least one other color being at least indistinguishable via a grayscale recognition; and
   (c) each of the minimum recognition areas, for a reflection and/or for a rotation about an angle that corresponds to a natural multiple of $2\pi/n$, is unambiguously recognizable and associable.

15. The marker device as recited in claim 14, wherein the each of the plurality of structures has the respective plurality of corners, and the each of the substructures has the shape without corners whose center point is positioned on the point of the geometric centroid of the respective one of the structures.

16. The marker device as recited in claim 14, wherein the structures each have the one of the at least two colors and the substructures each have the one of at least two other colors, in each case the at least one color of the at least two colors having at least essentially the same brightness value as the at least one other color of the at least two other colors, the at least one color and the at least one other color being at least indistinguishable via the grayscale recognition.

17. The marker device as recited in claim 14, wherein the each of the minimum recognition areas, for the reflection and/or for the rotation about the angle that corresponds to the natural multiple of $2\pi/n$, is unambiguously recognizable and associable.

\* \* \* \* \*